US008718548B2

(12) United States Patent
Chang et al.

(10) Patent No.: US 8,718,548 B2
(45) Date of Patent: May 6, 2014

(54) METHOD AND APPARATUS FOR ADAPTIVE PARTITIONING OF LINKS

(75) Inventors: Christopher S. Chang, Pasadena, CA (US); Sundar Subramanian, Somerville, NJ (US); Xinzhou Wu, Monmouth Junction, NJ (US); Nilesh Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 13/232,170

(22) Filed: Sep. 14, 2011

(65) Prior Publication Data

US 2013/0065621 A1  Mar. 14, 2013

Related U.S. Application Data

(63) Continuation-in-part of application No. 12/142,588, filed on Jun. 19, 2008, now Pat. No. 8,140,103.

(60) Provisional application No. 60/948,978, filed on Jul. 10, 2007.

(51) Int. Cl.
*H04B 5/00* (2006.01)
*H04W 52/02* (2009.01)

(52) U.S. Cl.
USPC ........ 455/41.1; 455/512; 455/452.1; 455/509

(58) Field of Classification Search
USPC ............. 455/69, 67.11, 452.1, 450, 453, 464, 455/522, 41.1, 41.2, 509, 512, 62, 127.2, 455/126; 370/344, 432, 462, 346, 458
See application file for complete search history.

(56) References Cited

U.S. PATENT DOCUMENTS

| 7,151,769 | B2 | 12/2006 | Stanforth et al. |
| 7,796,573 | B2 * | 9/2010 | Belcea .................... 370/338 |
| 8,180,351 | B2 * | 5/2012 | Stanforth ................ 455/445 |
| 2004/0032847 | A1 | 2/2004 | Cain |
| 2009/0017861 | A1 * | 1/2009 | Wu et al. ................. 455/522 |
| 2010/0085973 | A1 | 4/2010 | Li et al. |
| 2010/0169498 | A1 | 7/2010 | Palanki et al. |
| 2010/0260101 | A1 | 10/2010 | Tsirtsis et al. |

OTHER PUBLICATIONS

Liu, Rui et al., "A Distributed Protocol for Adaptive Link Scheduling in Ad-hoc Networks", Department of Computer and Information Sciences, University of Delaware, Newark, DE 19716, pp. 1-11.
International Search Report and Written Opinion—PCT/US2012/055184—ISA/EPO—Jan. 24, 2013.

* cited by examiner

*Primary Examiner* — John J Lee
(74) *Attorney, Agent, or Firm* — James K. O'Hare

(57) ABSTRACT

Methods and apparatus for efficiently scheduling links in wireless communications networks are described. Various described methods and apparatus are well suited for use in ad hoc wireless networks in which scheduling decisions are made in a distributed and/or decentralized manner. In some embodiments, the links in a network, e.g., in a peer to peer ad hoc network, are adaptively grouped based on comparable link channel gain. Exemplary signaling used, in some but not necessarily all embodiments, by devices to estimate channel gains include broadcast connection identifier signals and reverse broadcast connection identifier signals. Grouping links into sets based on comparable link channel gain, and selectively ordering the scheduling priorities of the different groups, is used to improve scheduling efficiency, e.g., decrease the likelihood that unnecessary yielding occurs.

20 Claims, 22 Drawing Sheets

CONNECTION IDENTIFIER SIGNAL RESOURCES
702

| CID = 1 | CID = 9 | CID = 17 | CID = 25 | CID = 33 | CID = 41 | CID = 1 | CID = 9 | CID = 17 | CID = 25 | CID = 33 | CID = 41 |
|---|---|---|---|---|---|---|---|---|---|---|---|
| CID = 2 | CID = 10 | CID = 18 | CID = 26 | CID = 34 | CID = 42 | CID = 2 | CID = 10 | CID = 18 | CID = 26 | CID = 34 | CID = 42 |
| CID = 3 | CID = 11 | CID = 19 | CID = 27 | CID = 35 | CID = 43 | CID = 3 | CID = 11 | CID = 19 | CID = 27 | CID = 35 | CID = 43 |
| CID = 4 | CID = 12 | CID = 20 | CID = 28 | CID = 36 | CID = 44 | CID = 4 | CID = 12 | CID = 20 | CID = 28 | CID = 36 | CID = 44 |
| CID = 5 | CID = 13 | CID = 21 | CID = 29 | CID = 37 | CID = 45 | CID = 5 | CID = 13 | CID = 21 | CID = 29 | CID = 37 | CID = 45 |
| CID = 6 | CID = 14 | CID = 22 | CID = 30 | CID = 38 | CID = 46 | CID = 6 | CID = 14 | CID = 22 | CID = 30 | CID = 38 | CID = 46 |
| CID = 7 | CID = 15 | CID = 23 | CID = 31 | CID = 39 | CID = 47 | CID = 7 | CID = 15 | CID = 23 | CID = 31 | CID = 39 | CID = 47 |
| CID = 8 | CID = 16 | CID = 24 | CID = 32 | CID = 40 | CID = 48 | CID = 8 | CID = 16 | CID = 24 | CID = 32 | CID = 40 | CID = 48 |

REVERSE CONNECTION IDENTIFIER SIGNAL RESOURCES
704

| CID = 1 | CID = 9 | CID = 17 | CID = 25 | CID = 33 | CID = 41 | CID = 1 | CID = 9 | CID = 17 | CID = 25 | CID = 33 | CID = 41 |
|---|---|---|---|---|---|---|---|---|---|---|---|
| CID = 2 | CID = 10 | CID = 18 | CID = 26 | CID = 34 | CID = 42 | CID = 2 | CID = 10 | CID = 18 | CID = 26 | CID = 34 | CID = 42 |
| CID = 3 | CID = 11 | CID = 19 | CID = 27 | CID = 35 | CID = 43 | CID = 3 | CID = 11 | CID = 19 | CID = 27 | CID = 35 | CID = 43 |
| CID = 4 | CID = 12 | CID = 20 | CID = 28 | CID = 36 | CID = 44 | CID = 4 | CID = 12 | CID = 20 | CID = 28 | CID = 36 | CID = 44 |
| CID = 5 | CID = 13 | CID = 21 | CID = 29 | CID = 37 | CID = 45 | CID = 5 | CID = 13 | CID = 21 | CID = 29 | CID = 37 | CID = 45 |
| CID = 6 | CID = 14 | CID = 22 | CID = 30 | CID = 38 | CID = 46 | CID = 6 | CID = 14 | CID = 22 | CID = 30 | CID = 38 | CID = 46 |
| CID = 7 | CID = 15 | CID = 23 | CID = 31 | CID = 39 | CID = 47 | CID = 7 | CID = 15 | CID = 23 | CID = 31 | CID = 39 | CID = 47 |
| CID = 8 | CID = 16 | CID = 24 | CID = 32 | CID = 40 | CID = 48 | CID = 8 | CID = 16 | CID = 24 | CID = 32 | CID = 40 | CID = 48 |

FIGURE 8

METHOD AND APPARATUS FOR ADAPTIVE PARTITIONING OF LINKS

RELATED APPLICATIONS

The present application is a continuation-in-part of U.S. patent application Ser. No. 12/142,588, filed Jun. 19, 2008 which claims the benefit of U.S. Provisional Patent Application Ser. No. 60/948,978 filed Jul. 10, 2007.

FIELD

Various embodiments are directed to methods and apparatus for link transmission scheduling in a wireless communications system, e.g. in an ad hoc wireless network.

BACKGROUND

In some time-slotted wireless ad-hoc networks, the links in the network compete with each other for traffic segments, and a subset of the links that do not interfere with each other are scheduled, e.g., self-scheduled, for a particular traffic transmission slot. The set of links typically scheduled by practical distributed algorithms are not maximal, i.e., there are links outside the set of scheduled links which could also be added to the set without significant interference to the existing set.

In some implementations, using an approach of one round of connection scheduling, a link may yield to another yielding link, i.e., a link may unnecessarily decide to not compete. This unnecessary yielding can result in reduced traffic throughput than would otherwise have been possible if the unnecessary yielding did not occur.

In view of the above, it should be appreciated that there is a need for new methods and apparatus that reduce the likelihood that unnecessary yielding will occur.

SUMMARY

Various embodiments are directed to method and apparatus for efficiently scheduling links in wireless communications network. Various described methods and apparatus are well suited for use in ad hoc wireless networks in which scheduling decisions are made in a distributed and/or decentralized manner. In some embodiments, the links in a network, e.g., in a peer to peer ad hoc network, are adaptively grouped based on comparable link channel gain. Exemplary signaling used, in some but not necessarily all embodiments, by devices to estimate channel gain corresponding to links includes broadcast connection identifier signals and reverse broadcast connection identifier signals. In various embodiments, there is a predetermined relationship between a broadcast connection identifier signal and a reverse broadcast connection identifier signal which facilitates link channel gain estimation. Grouping links into sets based on comparable link channel gain, and selectively ordering the scheduling priorities of the different groups is used to improve scheduling efficiency, e.g., decrease the likelihood that unnecessary yielding occurs, as compared to approaches which do not use such link grouping.

An exemplary method of operating a first wireless communications device in an ad hoc network to perform link transmission scheduling for a first link, in accordance with some embodiments, comprises: estimating link channel gain for each of a plurality of links in said ad hoc network and assigning the first link to one of a plurality of different groups of links according to an estimated channel gain of the first link relative to estimated channel gains of other links. The exemplary method further comprises determining priority of the first link for a first time period based on a link identifier corresponding to the first link and the group of links to which the first link was assigned and making a first link scheduling decision for the first time period as a function of the determined priority of the first link.

An exemplary first wireless communications device for use in an ad hoc network, in accordance with some embodiments, comprises at least one processor configured to: estimate link channel gain for each of a plurality of links in said ad hoc network; assign a first link to one of a plurality of different groups of links according to an estimated channel gain of the first link relative to estimated channel gains of other links; determine priority of the first link for a first time period based on a link identifier corresponding to the first link and the group of links to which the first link was assigned; and make a first link scheduling decision for the first time period as a function of the determined priority of the first link. The exemplary first wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 8 illustrates exemplary forward connection identifier signal resources and exemplary reverse connection identifier signal resources in accordance with an exemplary embodiment.

DETAILED DESCRIPTION

Figure 1:
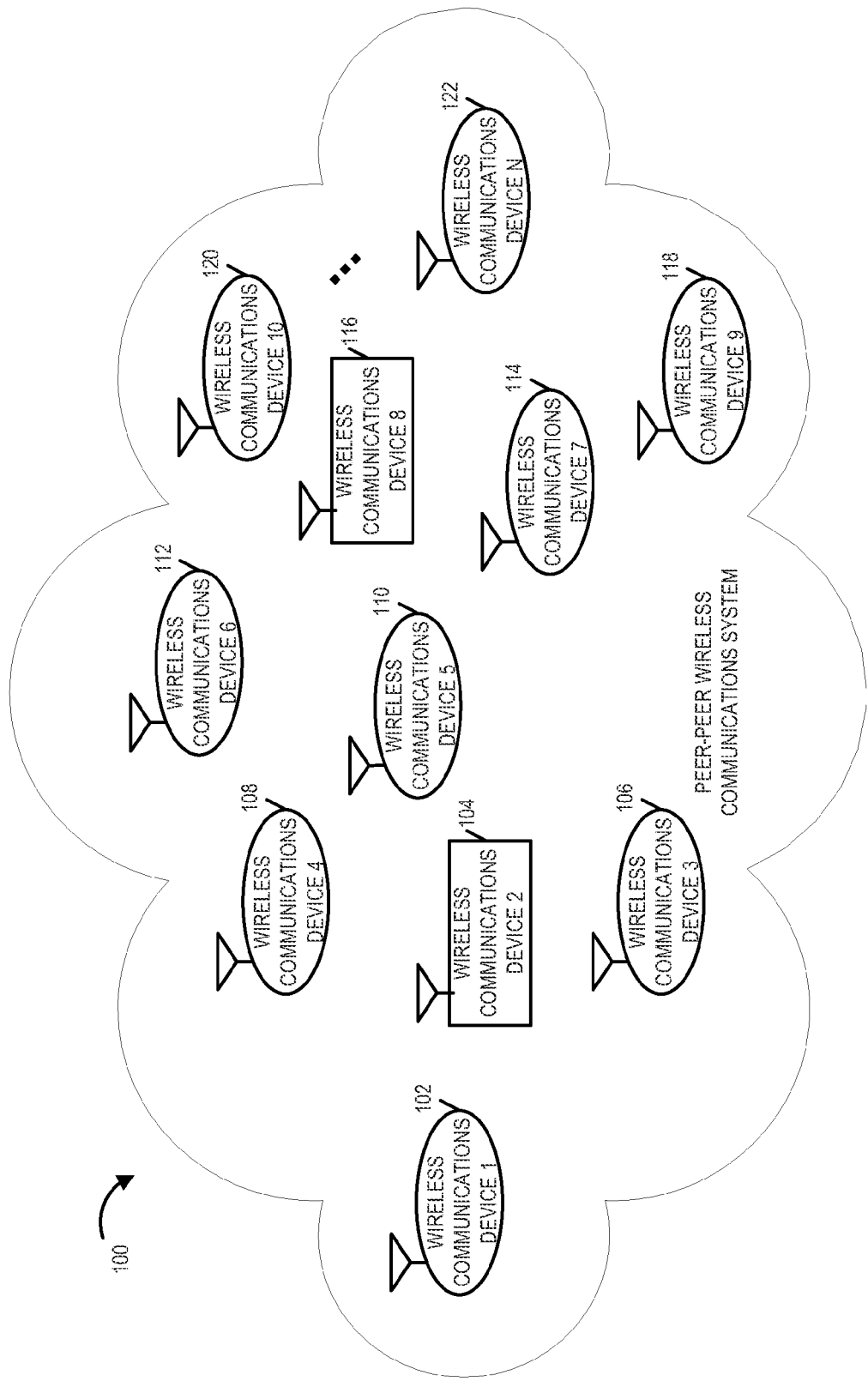
FIG. 1 is a drawing of an exemplary peer to peer wireless communications system in accordance with various exemplary embodiments.

FIG. 1 is a drawing of an exemplary peer to peer wireless communications system 100 in accordance with various exemplary embodiments. Exemplary peer to peer wireless communications system 100 includes a plurality of wireless communications devices (wireless communications device 1 102, wireless communications device 2 104, wireless communications device 3 106, wireless communications device 4 108, wireless communications device 5 110, wireless communications device 6 112, wireless communications device 7 114, wireless communications device 8 116, wireless communications device 9 118, wireless communications device 10 120, . . . , wireless communications device N 122) which support a peer to peer signaling protocol. Exemplary wireless communications devices (102, 106, 108, 110, 112, 114, 118, 120, 122) are mobile devices while wireless communications devices (104, 116) are stationary devices.

The wireless communications devices (102, 104, 106, 108, 110, 112, 114, 116, 118, 120, . . . , 122) in system 100 participate in an ad hoc peer to peer network. In various embodiments, link scheduling decisions for traffic transmission slots are performed in a decentralized manner.

A first device of a peer to peer link transmits a connection identifier signal, and a second device of the peer to peer link transmits a corresponding reverse connection identifier signal. The second device of the peer to peer link also transmits a connection identifier signal, and the first device of the peer to peer link also transmits a corresponding reverse connection identifier signal. Thus, both devices of a peer to peer link transmit both a connection identifier signal and a reverse connection identifier signal. The transmit power of the reverse connection identifier signal is a function of the receive power of the corresponding connection identifier signal, e.g. in accordance with a predetermined relationship. Devices of different links monitor for, detect, and measure received power of connection identifier signals and reverse connection identifier signals corresponding to other links. Based on received power measurements of a connection identifier signal and a reverse connection identifier signal of a link, which were transmitted by the same device, a channel gain for a link is determined by a wireless communications device. In some embodiments, received power measurements of connection identifier signals and reverse connection identifier signals, transmitted by devices at both ends of the link are used in determining channel gain for a link. However, in some other embodiments, a connection identifier signal and a reverse connection identifier signal from one of the end devices of a peer to peer link are used. A wireless communications device determines channel gains for a plurality of other links that it has detected to be operating in the network. The wireless communications device classifies the detected links into different groups based on channel gain. The wireless communications device assigns its own link to one of the different groups based on the channel gain of its own link relative to the estimated channel gain of the other links. In some embodiments, the membership of a link in a group is communicated to each of the other links through which CID is chosen for the link, e.g., a device using a link chooses a CID in a particular time-frequency space to belong to a group, and then other devices know by virtue of the CID group what group the link belongs to.

In various embodiments, the timing frequency structure, e.g., an OFDM based time-frequency structure, is advantageously implemented such that links of the same group, based on estimated channel gain, have the same group level priority when competing for a particular traffic segment. In some embodiments, a hopping function is used to change the group level priority over time. Within a group the different links have different priorities. In various embodiments, a hopping function is used to change the priority of links within a particular group over time.

Figure 2:
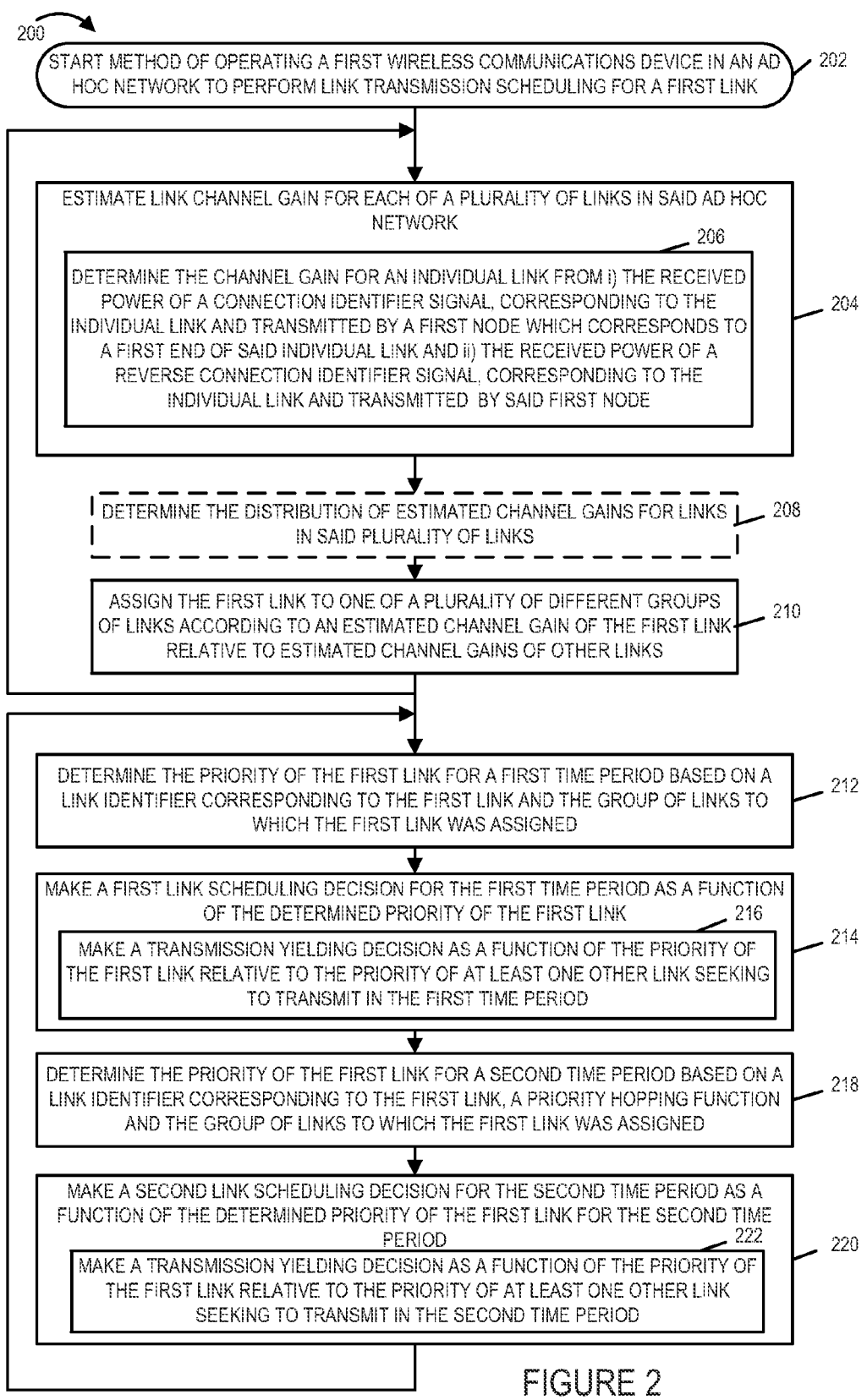
FIG. 2 is a flowchart of an exemplary method of operating a wireless communications device in accordance with various exemplary embodiments.

FIG. 2 is a flowchart 200 of an exemplary method of operating a first wireless communications device in an ad hoc network to perform link transmission scheduling for a first link in accordance with various embodiments. A link corresponds to a pair of wireless communications devices in the ad hoc network. The first link corresponds to a pair of wireless communications devices, and the first wireless communications device is one device in that pair. Operation starts in step 202, where the first wireless communications device is powered on and initialized. Operation proceeds from start step 202 to step 204. In step 204 the first wireless communications device estimates link channel gain for each of a plurality of links in said ad hoc network. In some embodiments, the estimate of channel link gain for a link is a near instantaneous measurement of channel gain.

In some embodiments, the plurality of different groups includes a first group of links, and links in the first group correspond to a first channel gain range. In some such embodiments, the plurality of different groups includes a second group of links, and links in the second group correspond to a second channel gain range. In some such embodiments, the second channel gain range has a higher gain than said first channel gain range. In various embodiments, links of the first channel gain range are referred to as long links and links of the second channel gain range are referred to as short links.

In some embodiments, there are at least three groups based on link channel gain, e.g., a high channel gain group sometimes referred to as a short length link group, an intermediate channel gain group sometimes referred to as a medium link length group and a low channel gain group sometimes referred to as a long length link group. In some embodiments, the priority of the different link groups is based on channel gain, and the priority of a group of low gain links does not fall between the priority of links corresponding to different groups of links having higher gains.

Step 204 includes step 206. In step 206, the first wireless communications device determines the channel gain for an individual link from i) the received power of a connection identifier signal, corresponding to the individual link and transmitted by a first node which corresponds to a first end of said individual link and ii) the received power of a reverse connection identifier signal, corresponding to the individual link and transmitted by the first node.

In various embodiments, the connection identifier signal is transmitted at a power level proportional to the power level data is transmitted on said individual link. In some embodiments, the reverse connection identifier signal is transmitted at a power level inversely proportional to the power level at which the connection identifier signal, transmitted by a second node, is received by the first node, wherein the second node corresponds to a second end of the individual link.

In some embodiments, the wireless communications device determines the channel gain for an individual link from i) the received power of a connection identifier signal, corresponding to the individual link and transmitted by a first node which corresponds to a first end of said individual link, ii) the received power of a reverse connection identifier signal, corresponding to the individual link and transmitted by the first node, iii) the received power of a connection identifier signal, corresponding to the individual link and transmitted by a second node which corresponds to a second end of said individual link, ii) the received power of a reverse connection identifier signal, corresponding to the individual link and transmitted by the second node.

In some embodiments, operation proceeds from step 204 to step 208; while in other embodiments, step 208 is not performed and operation proceeds from step 204 to step 210. Returning to step 208, in step 208 the first wireless communications device determines the distribution of estimated channel gains for links in said plurality of links. Operation proceeds from step 208 to step 210. In step 210 the first wireless communications device assigns the first link to one of a plurality of different groups of links according to an estimated channel gain of the first link relative to estimated channel gains of other links.

Some embodiments support the dynamic determination of groups. In some embodiments, including step 208, the assigning of the first link to one of a plurality of different groups according to an estimated channel gain of the first link relative to the estimated channel gains of other links in step 210 is based on the position of the estimated channel gain of the first link within the distribution of estimated channel gains.

In some embodiments, there is a fixed assignment type process, e.g., if your channel gain falls within a range of a group, you are assigned to that group. In some embodiments, the assigning of the first link to one of a plurality of different groups of links according to an estimated channel gain is based on the value of the estimated channel gain of the first link relative to one or more group gain ranges. In some embodiments, the thresholds for groups may change over time, e.g., the group gain ranges may change over time.

Operation proceeds from step 210 to step 204 for additional estimations of link channel gains at a later point in time, and to step 212.

In step 212 the first wireless communications device determines the priority of the first link for a first time period, e.g., a first transmission slot, based on a link identifier corresponding to the first link and the group of links to which the first link was assigned. Operation proceeds from step 212 to step 214. In step 214 the first wireless communications device makes a first link scheduling decision for the first time period as a function of the determined priority of the first link. In some embodiments, the first wireless communications devices makes the first link scheduling decision as a function of detected scheduling signals corresponding to links seeking to transmit during the first time period. Step 214 includes step 216 in which the first wireless communications device makes a transmission yielding decision as a function of the priority of the first link relative to the priority of at least one other link seeking to transmit in the first time period. In some embodiments, the transmission yielding decision is whether or not to transmit based on the interference which may be caused to another link. Operation proceeds from step 214 to step 218.

In step 218 the first wireless communications device determines the priority of the first link for a second time period, e.g., a second transmission slot, based on a link identifier corresponding to the first link, a priority hopping function and the group of links to which the first link was assigned. Operation proceeds from step 218 to step 220. In step 220 the first wireless communications device makes a second link scheduling decision for the second time period as a function of the determined priority of the first link for the second time period. Step 220 includes step 222 in which the first wireless communications device makes a transmission yielding decision as a function of the priority of the first link relative to the priority of at least one other link seeking to transmit in the second time period. Operation proceeds from step 220 to step 212 for another determination of priority of the first link.

In some embodiments, the first wireless communications device repeats said estimating and assigning steps. In some embodiments, the first wireless communications device repeats the estimating and assigning steps at a slower rate than the rate at which the hopping function hops. In some embodiments, the hopping function is such that any one particular link within a group has substantially the same average priority as another link within the group over one iteration of the recurring timing frequency structure. In some embodiments, the first wireless communications device assigns the first link to one of a plurality of different groups of links and remains in that assigned group for a plurality of link scheduling traffic transmission opportunities, e.g., traffic slots, in according with a timing and frequency schedule before first wireless communications device may have an opportunity to reassign the first link to a different group. In some embodiments, the plurality of link scheduling traffic transmission opportunities is a predetermined number. In some embodiments, there are at least 100 traffic slots between opportunities for a wireless communications device to assign the first link to a different group than the group to which it is currently assigned.

Figure 3:
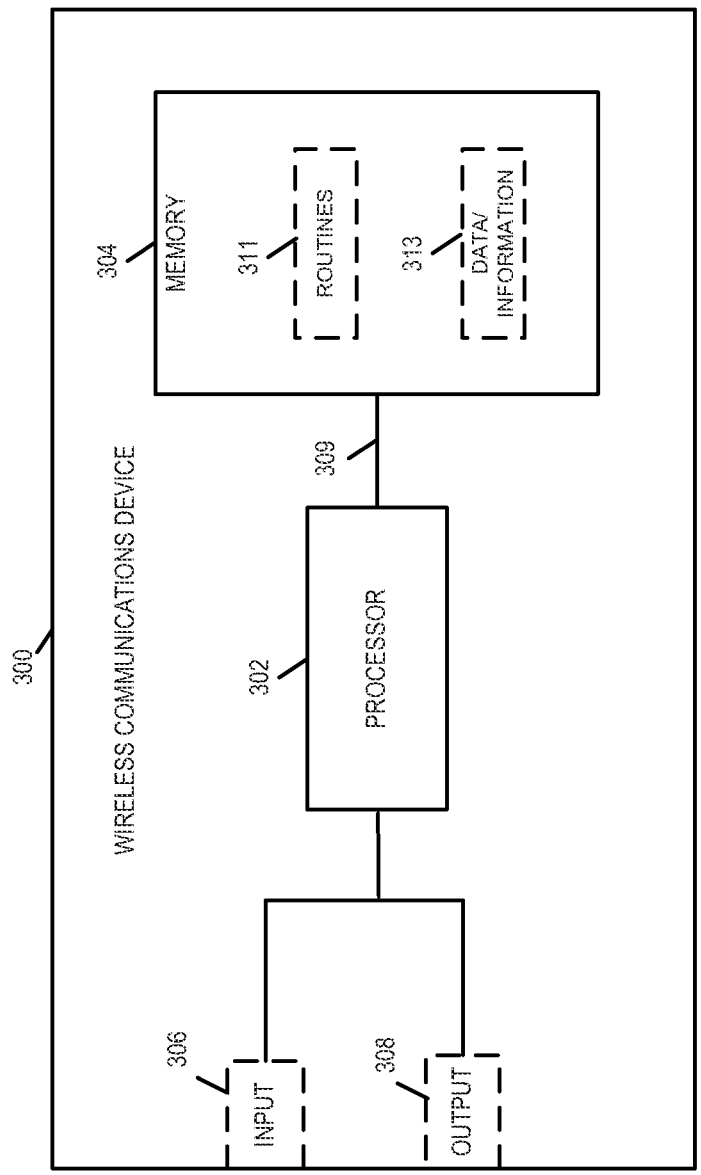
FIG. 3 is a drawing of an exemplary wireless communications device in accordance with an exemplary embodiment.

FIG. 3 is a drawing of an exemplary wireless communications device 300 in accordance with an exemplary embodiment. Exemplary wireless communications device 300 is, e.g., one of the wireless communications devices of system 100 of FIG. 1. Wireless communications device 300 is, e.g., a wireless communications device which supports a peer to peer signaling protocol. Exemplary wireless communications device 300 may, and sometimes does, implement a method in accordance with flowchart 200 of FIG. 2.

Wireless communications device 300 includes a processor 302 and memory 304 coupled together via a bus 309 over which the various elements (302, 304) may interchange data and information. Wireless communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In various embodiments, processor 302 is configured to: estimate link channel gain for each of a plurality of links in said ad hoc network; assign a first link to one of a plurality of different groups of links according to an estimated channel gain of the first link relative to estimated channel gains of other links; determine priority of the first link for a first time period based on a link identifier corresponding to the first link and the group of links to which the first link was assigned; and make a first link scheduling decision for the first time period as a function of the determined priority of the first link.

In some embodiments, processor 302 is further configured: determine a priority of the first link for a second time period based on a link identifier corresponding to the first link, a priority hopping function, and the group of links to which the first link was assigned; and make a second link scheduling decision for the second time period as a function of the determined priority of the first link for the second period of time.

In some embodiments, processor 302 is further configured to repeat said estimating and assigning steps. In some such embodiments, processor 302 is configured to repeat said estimating and assigning steps at a slower rate than the rate at which said hopping function hops.

In various embodiments, processor 302 is configured to make said first link scheduling decision as a function of detected scheduling signals corresponding to links seeking to transmit during said first time slot.

In some embodiments, the plurality of different groups includes a first group of links, links in said first group corresponding to a first channel gain range, e.g., long links; and the plurality of different groups includes a second group of links, links in said second group corresponding to a second channel gain range, e.g., short links, said second channel gain range having a higher gain than said first channel gain range.

In some embodiments, processor 302 is configured to determine the channel gain for an individual link from i) the received power of a connection identifier signal corresponding to the individual link transmitted by a first node, which corresponds to a first end of said individual link and ii) the received power of a reverse connection identifier signal corresponding to the individual link, said reverse connection identifier signal transmitted by said first node, as part of being configured to estimate link channel gain. In some embodiments, said connection identifier signal is transmitted at a power level proportional to the power level data is transmitted at on said individual link. In some embodiments, said reverse connection identifier signal is transmitted at a power level inversely proportional to the power level at which the connection identifier signal, transmitted by a second node, is received by the first node, wherein the second node corresponds to a second end of the individual link. In some embodiments, processor 302 is configured to transmit a connection identifier signal at a power level proportional to the power level data is transmitted at on said first link. In some embodiments, processor 302 is configured to transmit a reverse connection identifier signal at a power level inversely proportional to the power level at which the connection identifier signal corresponding to the first link is received. In some embodiments, processor 302 is configured to transmit one of: (i) a connection identifier signal at a power level proportional to the power level data is transmitted at on said first link and (ii) a reverse connection identifier signal at a power level inversely proportional to the power level at which the connection identifier signal corresponding to the first link is received; and processor 302 is configured to receive the other one of: (i) the connection identifier signal corresponding to said first link and (ii) a reverse connection identifier signal corresponding to the first link. In some embodiments, processor 302 is configured to transmit both a connection identifier signal and a reverse connection identifier signal corresponding to the first link. In some embodiments, processor 302 is configured to receive both a connection identifier signal and a reverse connection identifier signal corresponding to the first link.

In some embodiments, the priority of the different link groups is based on channel gain, and the priority of a group of low gain links does not fall between the priority of links corresponding to different groups of links having higher gains.

In various embodiments, processor 302 is further configured to make a transmission yielding decision as a function of the priority of said first link relative to the priority of at least one other link seeking to transmit in the first time period, as part of being configured to make a first link scheduling decision.

In some embodiments, said transmission yielding decision is whether or not to transmit based on the interference which may be caused to said another link.

In various embodiments, processor 302 is further configured to: determine the distribution of estimated channel gains for links in said plurality of links; and processor 302 is configured to assign the first link to one of a plurality of different groups of links according to an estimated channel gain of the first link relative to the estimated channel gains of other links based on the position of the estimated gain of the first link within the distribution of estimated channel gains, as part of being configured to assign the first links.

In some embodiments, processor 302 is configured to assign the first link to one of a plurality of different groups of links according to an estimated channel gain of the first link relative to the estimated channel gains of other links based on the value of the estimated channel gain of the first link relative to one or more group gain ranges, as part of being configured to assign the first link.

Figure 4:
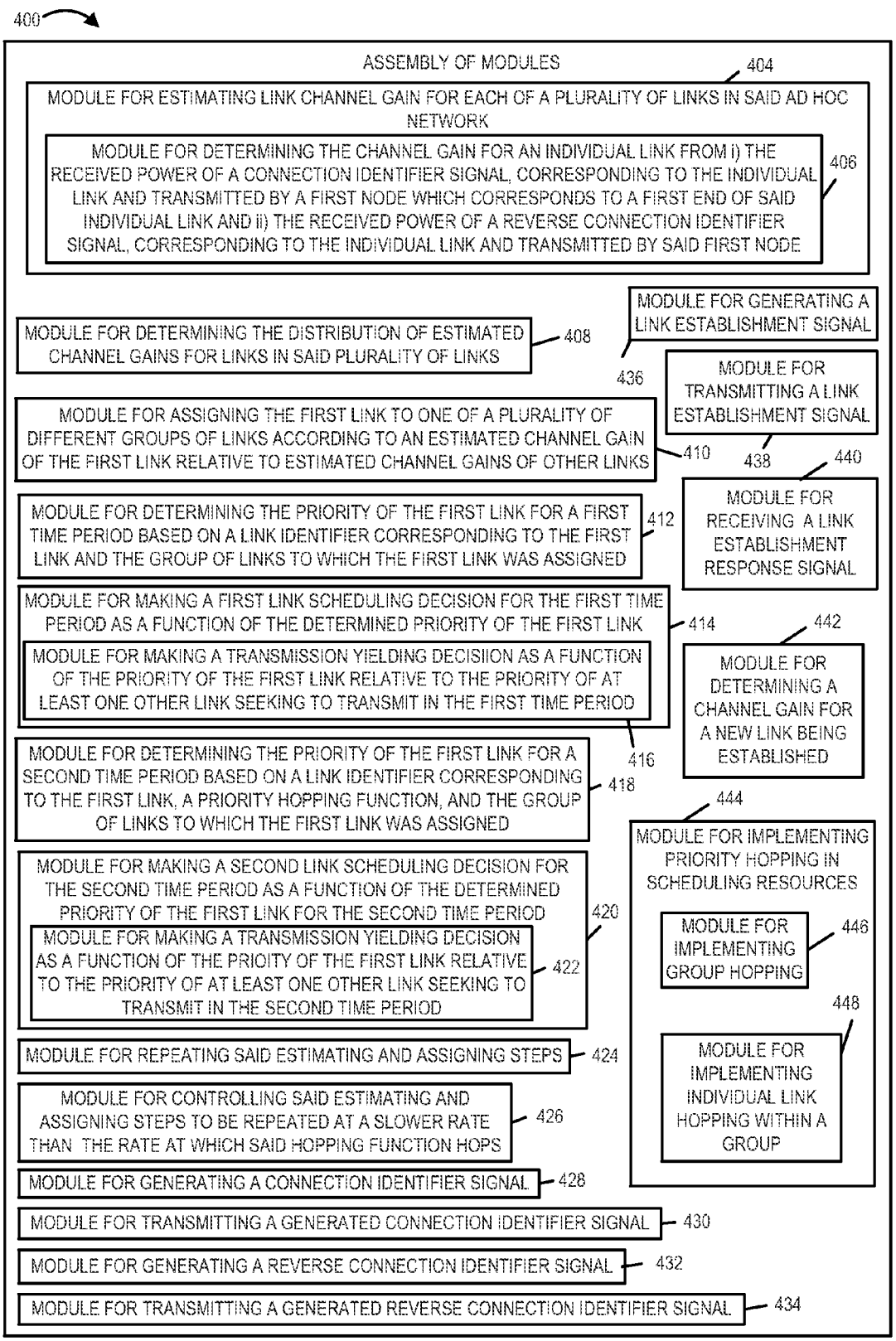
FIG. 4 is a drawing of an assembly of modules which can be, and in some embodiments is, used in the exemplary wireless communications device illustrated in FIG. 3.

FIG. 4 is an assembly of modules 400 which can, and in some embodiments is, used in the exemplary wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless communications device 300 or elements therein such as the processor 302, to perform the functions of the corresponding steps illustrated and/or described in the method of flowchart 200 of FIG. 2.

Assembly of modules 400 includes a module for estimating channel gain for each of a plurality of links in an ad hoc network 404, and a module for determining the distribution of estimated channel gains for links in said plurality of links 408. Module 404 includes a module for determining the channel gain for an individual link from i) the received power of a connection identifier signal, corresponding to the individual link and transmitted by a first node which corresponds to a first end of said individual link, and ii) the received power level of a reverse connection identifier signal, corresponding to the individual link, said reverse connection identifier signal and transmitted by said first node 406. In some embodiments, module 404 determines the channel gain for an individual link based on received power measurements of connection identifier signals and reverse connection identifier signals transmitted by nodes at both ends of the individual link. Assembly of modules 400 further includes a module for assigning the first link to one of a plurality of different groups of links according to an estimated channel gain of the first link relative to estimated channel gains of other links 410. In some embodiments, different non-overlapping sets of connection identifiers correspond to different groups in accordance with a predetermined mapping.

Assembly of modules 400 further includes a module for determining the priority of the first link for a first time period based on a link identifier corresponding to the first link and the group of links to which the first link was assigned 412, a module for making a first link scheduling decision for the first time period as a function of the determined priority of the first link 414, a module for determining the priority of the first link for a second time period based on a link identifier corresponding to the first link, a priority hopping function and the group of links to which the first link was assigned 418, and a module for making a second link scheduling decision for the second time period as a function of the determined priority of the first link for the second time period 420. Module 414 includes a module for making a transmission yielding decision as a function of the priority of the first link relative to the priority of at least one other link seeking to transmit in the first time period 416. Module 420 includes a module for making a transmission yielding decision as a function of the priority of the first link relative to the priority of at least one other link seeking to transmit in the second time period 422.

In various embodiments, the estimating and assigning steps are repeated at a slower rate than the rate at which the hopping function hops. For example, the first wireless device may estimate link gains. Assembly of modules 400 further includes a module for repeating said estimating and assigning steps 424 and a module for controlling said estimating and assigning steps to be repeated at a slower rate than the rate at which said hopping function hops 426.

In some embodiments, said plurality of different groups includes a first group of links and links in said first group correspond to a first channel gain range; and said plurality of different groups includes a second group of links and links in said second group correspond to a second channel gain range, and said second channel gain range has a higher gain than said first channel gain range.

In some embodiments, said connection identifier signal is transmitted at a power level proportional to the power level data is transmitted on said individual link. Assembly of modules 400 further includes a module for generating a connection identifier signal 428 and a module for transmitting a generated connection identifier signal 430. In some embodiments, module 430 transmits a generated connection identifier signal at a power level proportional to the power level data is transmitted on its link.

In some embodiments, said reverse connection identifier signal is transmitted at a power level inversely proportional to the power level at which the connection identifier signal, transmitted by the second node, is received by the first node, wherein the second node corresponds to a second end of the individual link. Assembly of modules 400 further includes a module for generating a reverse connection identifier signal 432 and a module for transmitting said generated reverse connection identifier signal 434. In some embodiments, module 434 transmits a reverse connection signal at a power level inversely proportional to the power level at which a connection identifier signal of its link is received.

Assembly of modules 400 further includes a module for generating a link establishment signal 436, a module for transmitting a generated link establishment signal 438, a module for receiving a link establishment response signal 440, and a module for determining a channel gain for a new link being established 442, e.g. based on information included in or derived from the received link establishment response signal.

Assembly of modules 400 further includes a module for implementing priority hopping in scheduling resources 444. Module 444 further includes a module for implementing group hopping 446 and a module for implementing individual link hopping within a group 448.

In some embodiments, there are at least three different groups of links based on channel gain. In some such embodiments, the priority of the different link groups is based on channel gain, and the priority of a group of low gain links, sometimes referred to as long length links, does not fall between the priority of links corresponding to different groups of links having higher gains. In various embodiments, this characteristic of a group of low channel gain links not falling between higher channel gain link groups is incorporated into the timing frequency structure which is being implemented by the device including assembly of modules 400.

In some embodiments, said transmission yielding decision of module 416 is whether or not to transmit based on the interference which may be caused to said another link.

In some embodiments, the module 410 for assigning the first link to one of a plurality of different groups of links according to an estimated channel gain of the first link relative to the estimated channel gains of other links bases the assigning on the position of the estimated gain of the first link within the distribution of estimated channel gains obtained by module 408. In some embodiments, the module 410 for assigning the first link to one of a plurality of different groups of links according to an estimated channel gain of the first link relative to the estimated channel gains of other links bases the assigning on the value of the estimated channel gain of the first link relative to one or more group gain ranges.

Various aspects and/or features of some, but not necessarily all, embodiments are described below. Various embodiments are directed to method and apparatus for adaptively grouping the links in a network, e.g., a peer to peer ad hoc network, into groups of comparable length and/or channel gain. Exemplary signaling used by the links to achieve this property is described. Grouping links into sets of comparable length and/or channel gain helps improve scheduling, e.g., traffic scheduling.

In some time-slotted wireless ad-hoc networks, the links in the network compete with each other, and a subset of the links that do not interfere with each other are scheduled for a particular traffic transmission slot. The set of links typically scheduled by some distributed algorithms are not maximal, i.e., there are links outside the set of scheduled links which could also be added to the set without causing excessive interference to the existing set. Excessive interference can be determined based on SINR threshold. Various exemplary embodiments described herein improve the likelihood that unnecessary yielding does not occur in traffic scheduling in an ad hoc network.

Figure 5:
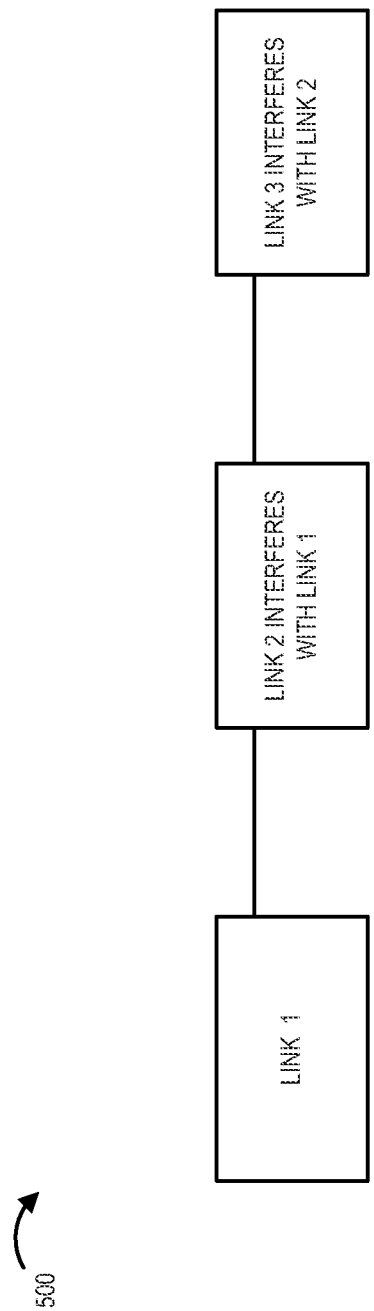
FIG. 5 illustrates three exemplary links which interfere with one another.

In some known implementations, with one round of connection scheduling a link may yield to another yielding link, i.e., a link may unnecessarily decide to not compete. Consider for example, the example of drawing 500 of FIG. 5. For example Link 1, of highest priority, interferes with Link 2, having second highest priority, and Link 2 interferes with Link 3, having lowest priority.

In this situation, the Link 3 yields to Link 2 which yields to Link 1, when Link 3 and Link 1 could have been scheduled together. If Link 2's priority does not occur between Link 1 and 3, then the unnecessary yielding can be avoided.

Typically such situations arise due to Link 2 being a longer link, e.g., being a poorer channel with a lower channel gain, than Link 1 or Link 3. By grouping the links according to their length and/or gain and assigning priorities appropriately, e.g., such that a long link's priority does not fall between short links, the capacity and the number of links that can be simultaneously scheduled by reducing unnecessary yielding is improved as compared to at least some systems which do not perform such grouping. In various embodiments, links are grouped according to their length and assigned priorities appropriately, e.g., groups of long links are assigned priority such that a long link's priority does not fall between short links priority.

In some exemplary embodiments, in the link resolution phase such as, e.g., a Connection Identification (CID) broadcast interval, the nodes in a link transmit a forward tone at a power that is proportional to the transmit power used in the data slots, e.g., P1. The nodes in a link also transmit an inverse tone at a power that is proportional to the inverse of the received power from the other end of the link's forward tone i.e. $k/(h_{12}*P1)$, where k is a constant, $h_{12}$ is the channel gain of the link between node 1 and node 2, P1 is the transmit power of the forward tone, and $k/(h_{12}*P1)$ is the transmit power of the inverse tone. Thus, another receiver of a node corresponding to a different link observing the forward and the inverse power can compute the length of that link, and can estimate the relative length of its own link with respect to other links in the network. That is, it can classify itself as a long or a short link and join a group of links with comparable lengths or channel strengths. By observing the link lengths of each of the links and comparing them to a device's own link length, the device joins a group with path-losses that are comparable.

An exemplary protocol can be as follows. When initializing a data communication with another peer, a device first observes the transmit power and inverse power of other links in the system, e.g. via CID channels in a peer to peer timing and frequency structure of the peer to peer network. The device computes the cumulative distribution (CDF) of the path-losses of other links in the system. If its own path-loss falls in the top one third, it classifies itself as a long link and chooses a resource in the group reserved for long links. It then transmits the forward and the inverse tone corresponding to its own path loss within the resource in that group. Similarly, the link joins the medium group if the path-loss is in the middle third or joins the short links if its path-loss is in the last one-third of the observed path-losses. After the joining the system, each device also keeps monitoring the topology change in the networking by keep listening to the CID channel and may, and sometimes does, changes its group, based upon the information it receives.

Figure 6:
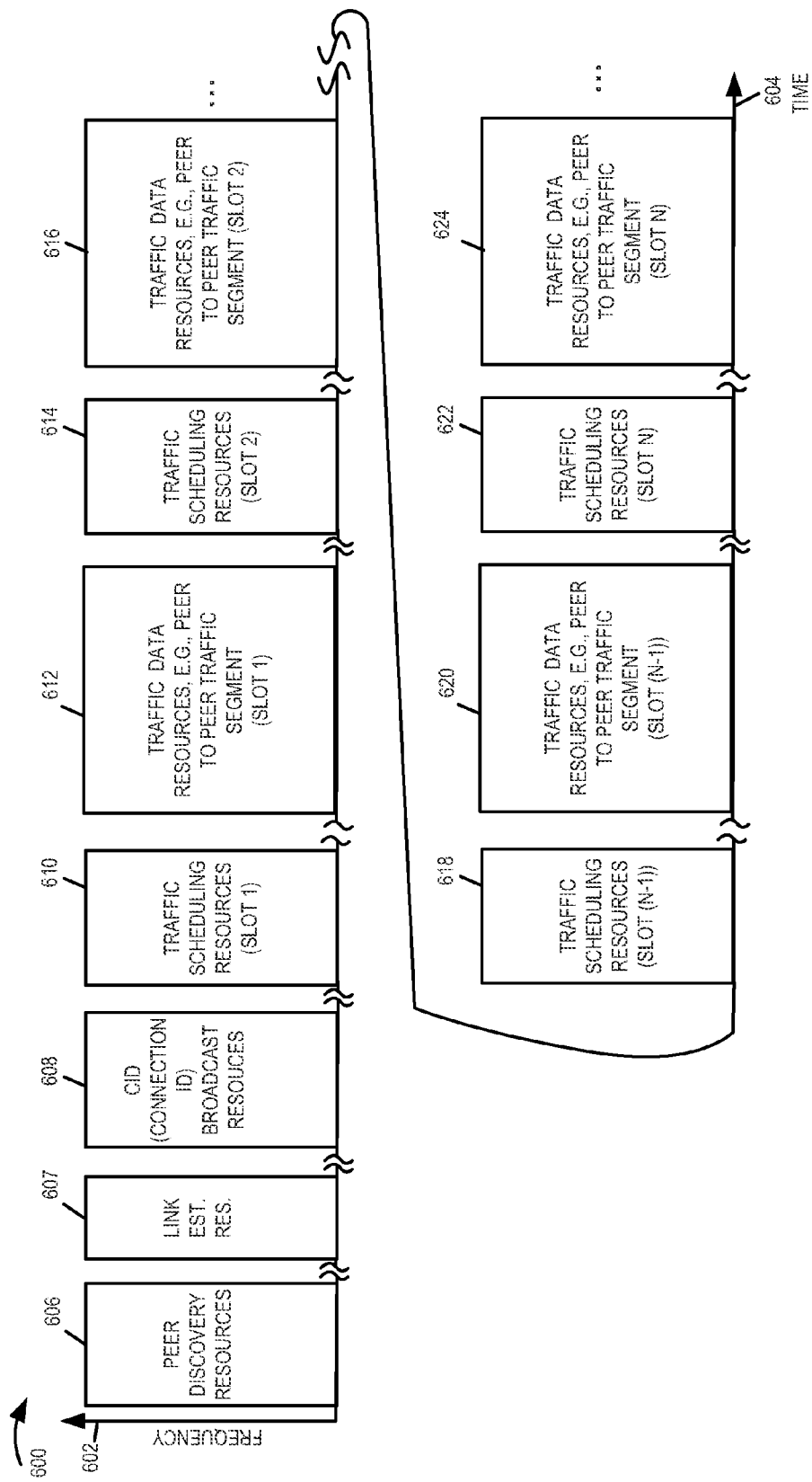
FIG. 6 is a drawing of an exemplary recurring timing frequency structure in accordance with an exemplary embodiment.

FIG. 6 is a drawing 600 of an exemplary recurring timing frequency structure in accordance with an exemplary embodiment. Timing frequency structure of FIG. 6 may be implemented by device 300 of FIG. 3, e.g., with information used to derive the structure stored in memory 304. Vertical axis 602 represents frequency, e.g., OFDM tones, and horizontal axis 604 represent time, e.g., OFDM symbol transmission time intervals. The exemplary timing frequency structure of FIG. 6 includes peer discovery resources 606, connection establishment resources 607, connection ID (CID) broadcast resources 608, and a plurality of set of traffic resources ((traffic scheduling resource for slot 1 610, traffic data resources for slot 1 612, e.g., a peer to peer traffic segment for slot 1), (traffic scheduling resource for slot 2 614, traffic data resources for slot 2 616, e.g., a peer to peer traffic segment for slot 2), . . . , (traffic scheduling resource for slot (N−1) 618, traffic data resources for slot (N−1) 620, e.g., a peer to peer traffic segment for slot (N−1), (traffic scheduling resource for slot N 622, traffic data resources for slot N 624, e.g., a peer to peer traffic segment for slot N)).

Figure 7:
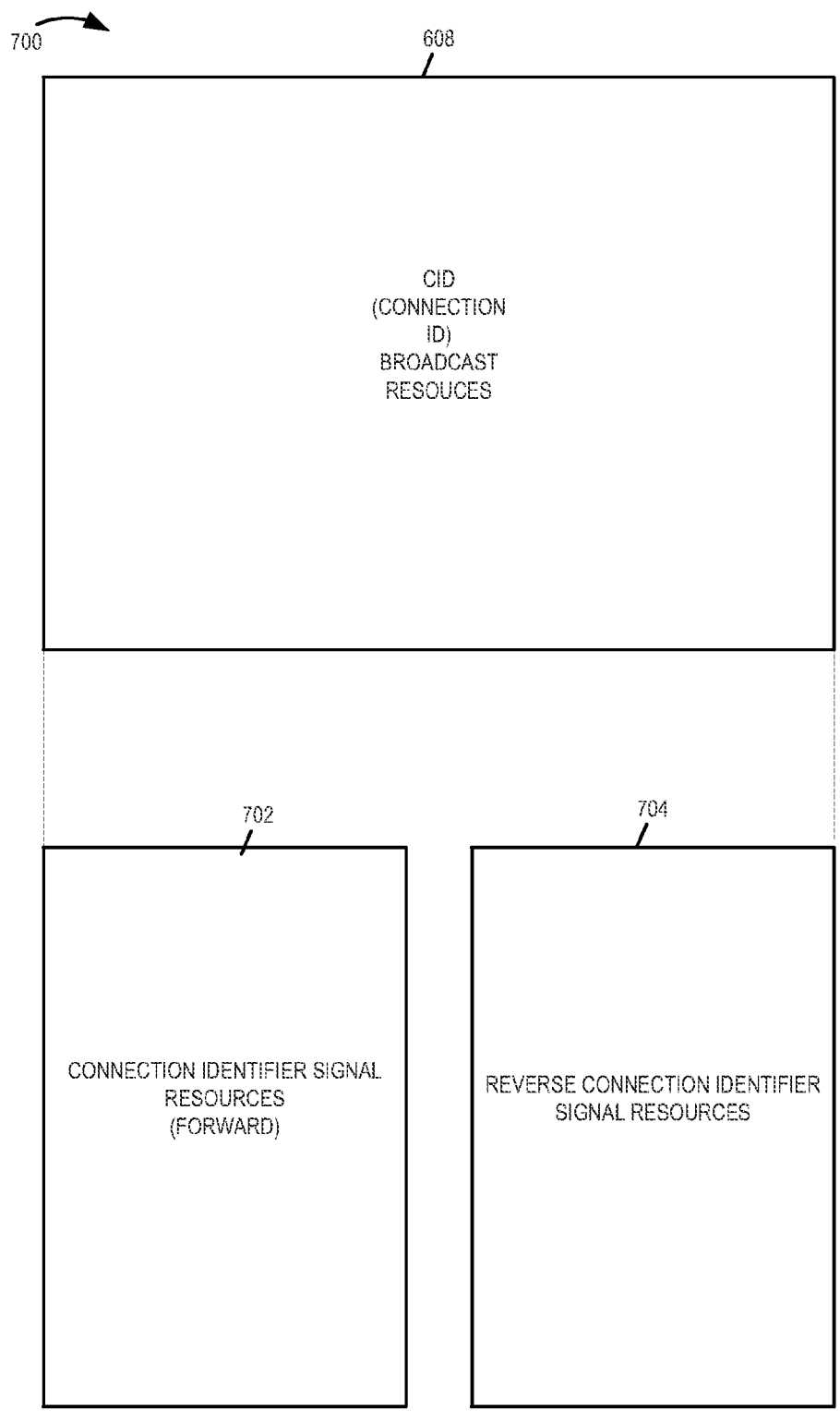
FIG. 7 illustrates exemplary connection ID broadcast resources in accordance with an exemplary embodiment.

Drawing 700 of FIG. 7 illustrates that exemplary CID broadcast resources 608 of FIG. 6 includes connection identifier signal resources 702, sometimes referred to as forward connection identifier signal resources, and reverse connection identifier signal resources 704. Drawing 800 of FIG. 8 illustrates exemplary partitioning of the connection identifier signal resources 702 and the reverse connection identifier signal resources 704. In this example, there are 96 individual resources units in CID signaling resources 702, and each different connection identifier (CID=1, CID=2, . . . , CID=48) corresponds to two individual resource units in block 702. In this example, there are 96 individual resources units in reverse connection identifier signal resources 704, and each different connection identifier (CID=1, CID=2, . . . , CID=48) corresponds to two individual resource units in block 904. Each endpoint node of a peer to peer link, corresponding to a connection identifier, can transmit both a CID signal and reverse CID signal.

For each resource, associated with a CID, in forward CID resources 702, there is a corresponding resource in reverse connection identifier resources 704, associated with the same CID. In some embodiments, a forward CID resource associated with a particular CID, e.g., resource 802 associated with CID=1 is used to carry a connection identifier broadcast signal from one device in the pair of devices corresponding to the connection having connection identifier CID=1; and a reverse CID resource associated with a particular CID, e.g., resource 804 associated with CID=1 is used to carry a reverse connection identifier broadcast signal from the other device in the pair of devices corresponding to the connection having connection identifier CID=1. The reverse connection identifier broadcast signal is a response to a connection identifier broadcast signal. In some embodiments, the reverse connection identifier signal is transmitted at a power level inversely proportional to the power level at which the corresponding forward CID broadcast signal is received by the device which broadcasts the reverse CID signal.

For CID=1, a first resource pair is forward CID resource 802 and reverse CID resource 804. For CID=1, a second resource pair is forward resource 852 and reverse CID resource 854.

In other embodiments, there may be a different number of CIDs used in the system, and one resource unit in resource block 702 corresponds to each CID that is used, and one resource unit in resource block 704 corresponds to each CID that is used. In some embodiments, an individual resource unit corresponding to a CID, e.g., resource unit 802 corresponding to CID=1 or resource unit 804 corresponding to CID=1, is a single OFDM tone-symbol which represents one OFDM tone for 1 OFDM symbol transmission time interval.

Figure 9:
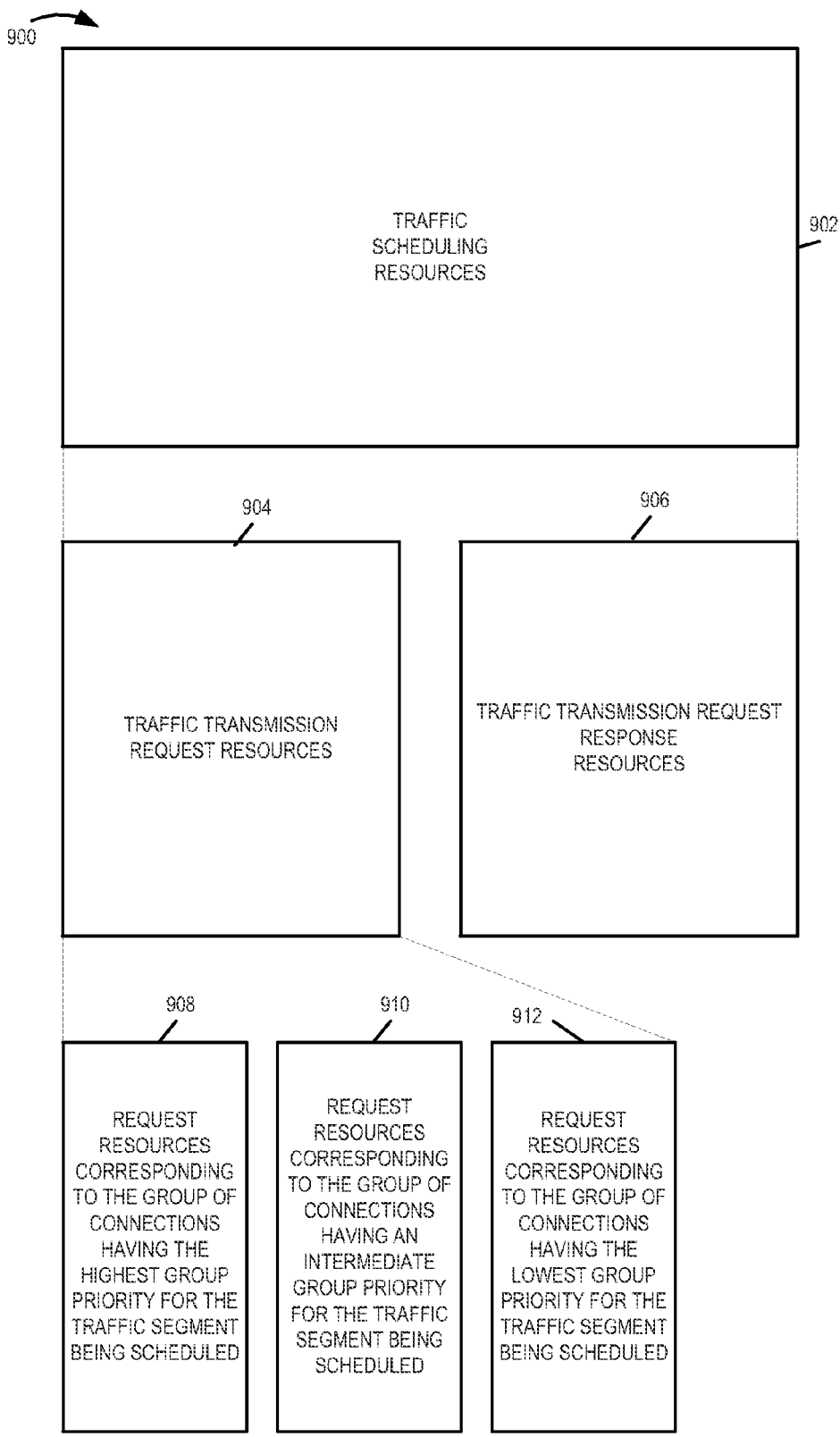
FIG. 9 illustrates exemplary traffic scheduling resources in accordance with an exemplary embodiment.

Drawing 900 of FIG. 9 illustrates exemplary traffic scheduling resources 902 in accordance with an exemplary embodiment. Traffic scheduling resources 902 is, e.g., any of the traffic scheduling resources (610, 614, . . . , 618, 622) of FIG. 6. Exemplary traffic scheduling resources 902 includes traffic transmission request resources 904 and traffic transmission request response resource 906. Traffic transmission request resources 904 includes request resources corresponding to the group of connection having the highest group priority for the traffic segment being scheduled 908, request resources corresponding to the group of connections having an intermediate group priority for the traffic segment being scheduled 910 and request resources corresponding to the group of connections having the lowest group priority for the traffic segment being scheduled 912.

Figure 10:
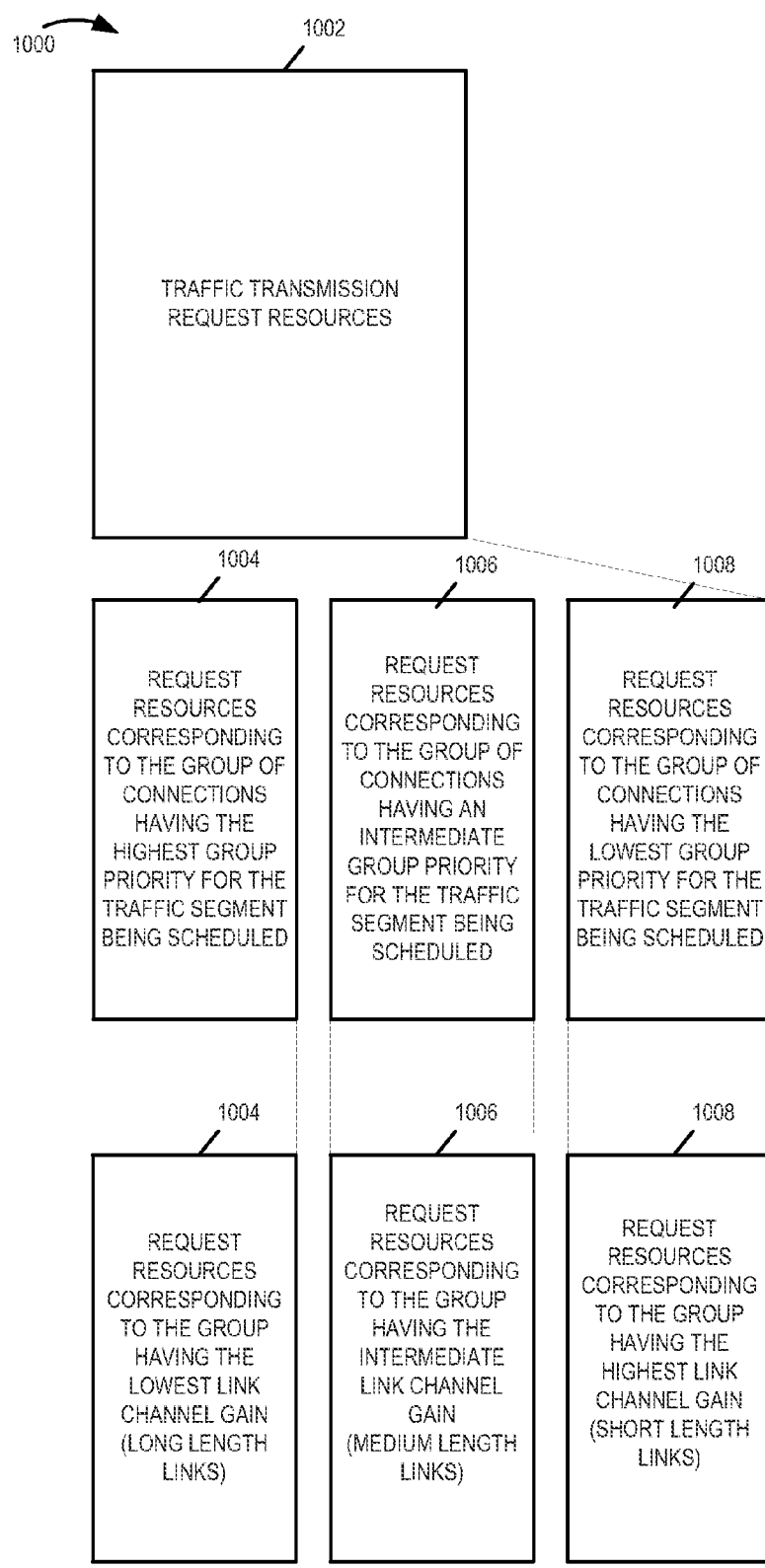
FIG. 10 illustrates one example of traffic transmission request resources in accordance with an exemplary embodiment.

Drawing 1000 of FIG. 10 illustrates exemplary traffic transmission request resources 1002 in accordance with an exemplary embodiment. Traffic transmission request resources 1002 is, e.g., traffic transmission request resources 904 of FIG. 9. Traffic transmission request resources 1002 includes request resources corresponding to the group of connection having the highest group priority for the traffic segment being scheduled 1004, request resources corresponding to the group of connections having an intermediate group priority for the traffic segment being scheduled 1006 and request resources corresponding to the group of connections having the lowest group priority for the traffic segment being scheduled 1008. In the example of FIG. 10, the request resource block with the highest group priority 1004 corresponds to request resources corresponding to the group having the lowest link channel gain, e.g., the group having the longest link lengths. In the example of FIG. 10, the request resource block with intermediate group priority 1006 corresponds to request resources corresponding to the group having the intermediate link channel gain, e.g., the group having medium length links. In the example of FIG. 10, the request resource block with the lowest group priority 1008 corresponds to request resources corresponding to the group having the highest link channel gain, e.g., the group having the shortest link lengths.

Figure 11:
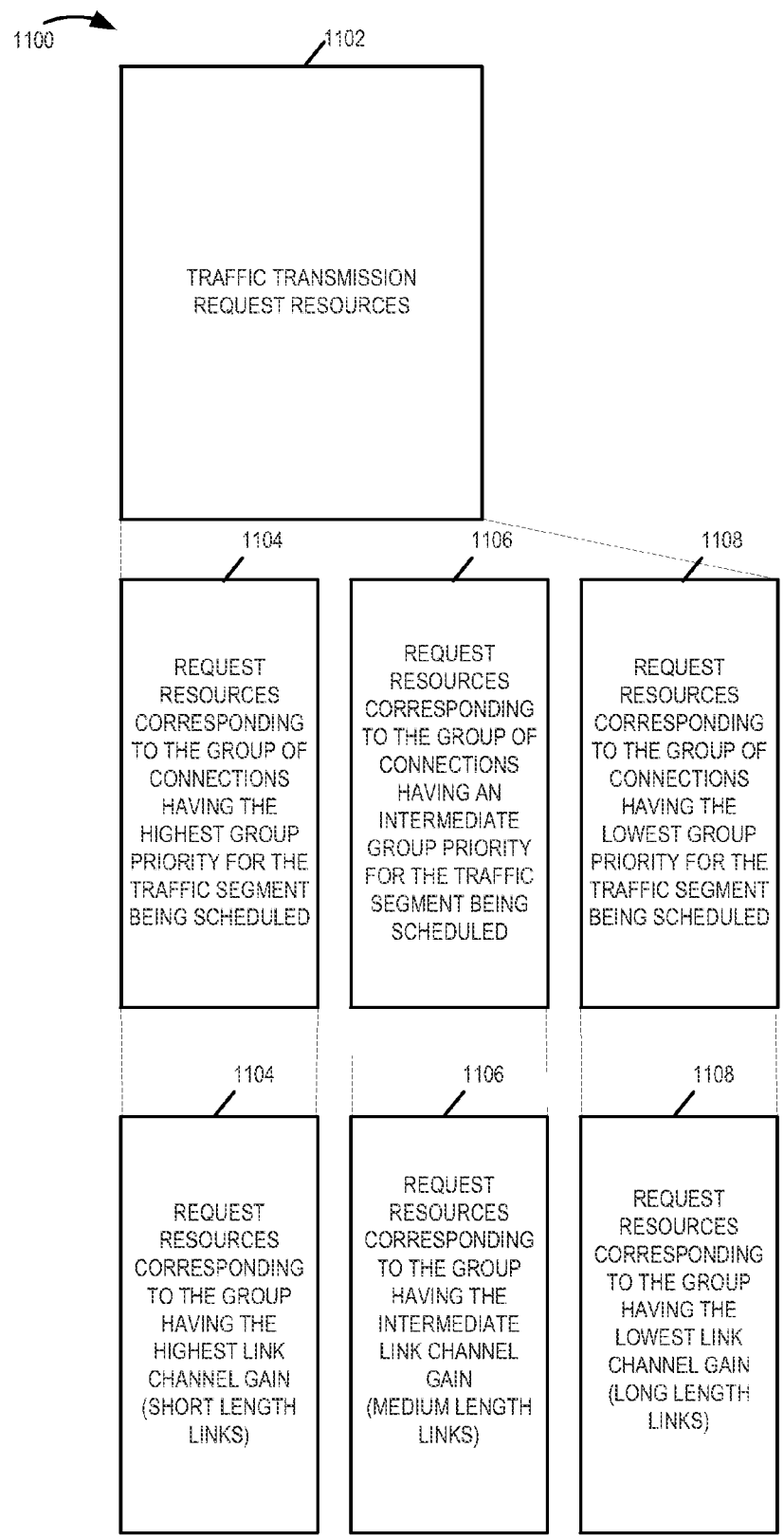
FIG. 11 illustrates another example of traffic transmission request resources in accordance with an exemplary embodiment.

Drawing 1100 of FIG. 11 illustrates exemplary traffic transmission request resources 1102 in accordance with an exemplary embodiment. Traffic transmission request resources 1102 is, e.g., traffic transmission request resources 904 of FIG. 9. Traffic transmission request resources 1102 includes request resources corresponding to the group of connection having the highest group priority for the traffic segment being scheduled 1104, request resources corresponding to the group of connections having an intermediate group priority for the traffic segment being scheduled 1106 and request resources corresponding to the group of connections having the lowest group priority for the traffic segment being scheduled 1108. In the example of FIG. 11, the request resource block with the highest group priority 1104 corresponds to request resources corresponding to the group having the highest link channel gain, e.g., the group having the shortest link lengths. In the example of FIG. 11, the request resource block with intermediate group priority 1106 corresponds to request resources corresponding to the group having the intermediate link channel gain, e.g., the group having medium length links. In the example of FIG. 11, the request resource block with the lowest group priority 1108 corresponds to request resources corresponding to the group having the lowest link channel gain, e.g., the group having the longest link lengths.

Figure 12:
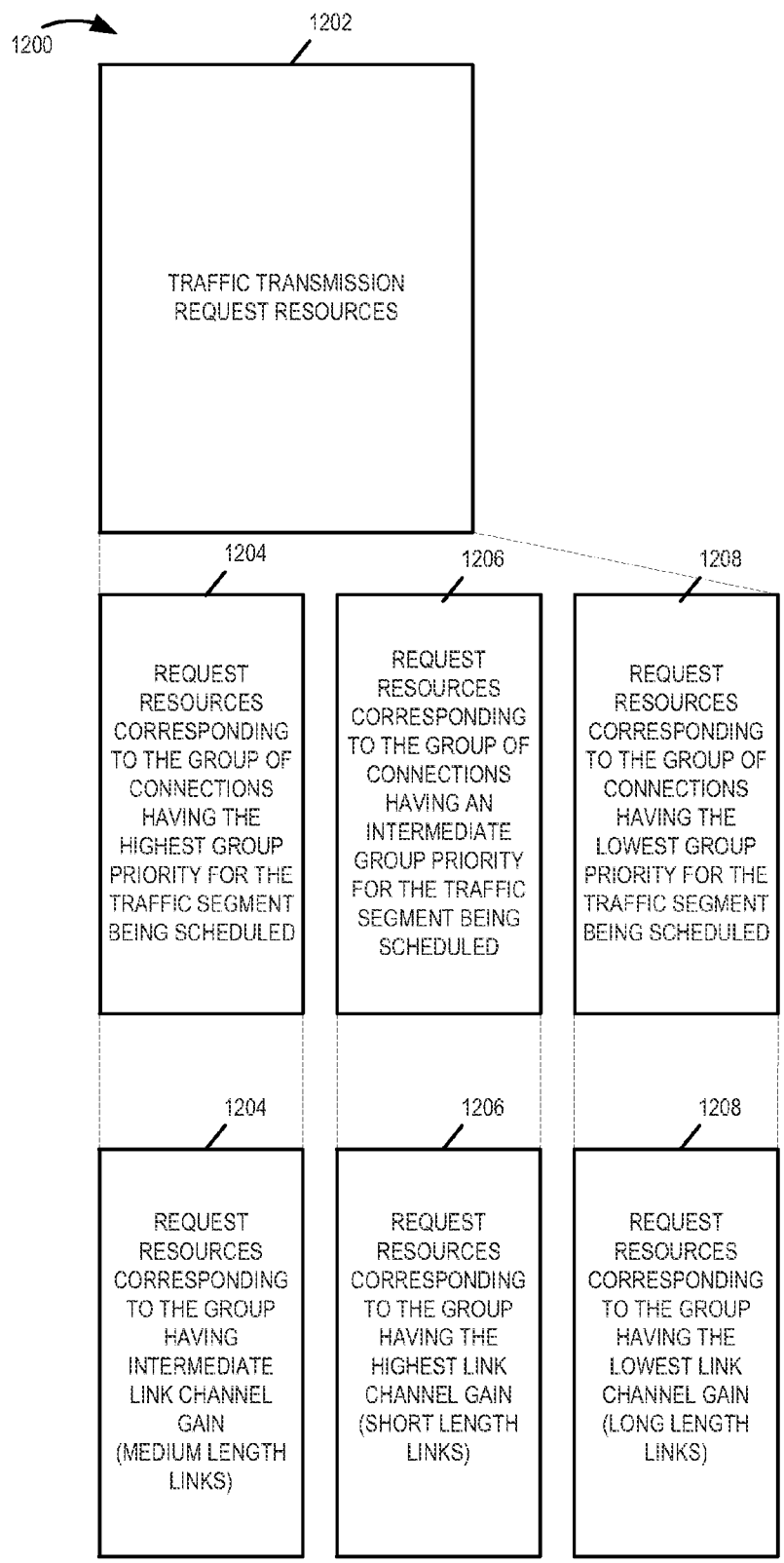
FIG. 12 illustrates yet another example of traffic transmission request resources in accordance with an exemplary embodiment.

Drawing 1200 of FIG. 12 illustrates exemplary traffic transmission request resources 1202 in accordance with an exemplary embodiment. Traffic transmission request resources 1002 is, e.g., traffic transmission request resources 904 of FIG. 9. Traffic transmission request resources 1202 includes request resources corresponding to the group of connection having the highest group priority for the traffic segment being scheduled 1204, request resources corresponding to the group of connections having an intermediate group priority for the traffic segment being scheduled 1206 and request resources corresponding to the group of connections having the lowest group priority for the traffic segment being scheduled 1208. In the example of FIG. 12, the request resource block with the highest group priority 1204 corresponds to request resources corresponding to the group having intermediate link channel gain, e.g., the group having medium link lengths. In the example of FIG. 12, the request resource block with intermediate group priority 1206 corresponds to request resources corresponding to the group having the highest link channel gain, e.g., the group having short length links. In the example of FIG. 12, the request resource block with the lowest group priority 1208 corresponds to request resources corresponding to the group having the lowest link channel gain, e.g., the group having the longest link lengths.

Figure 13:
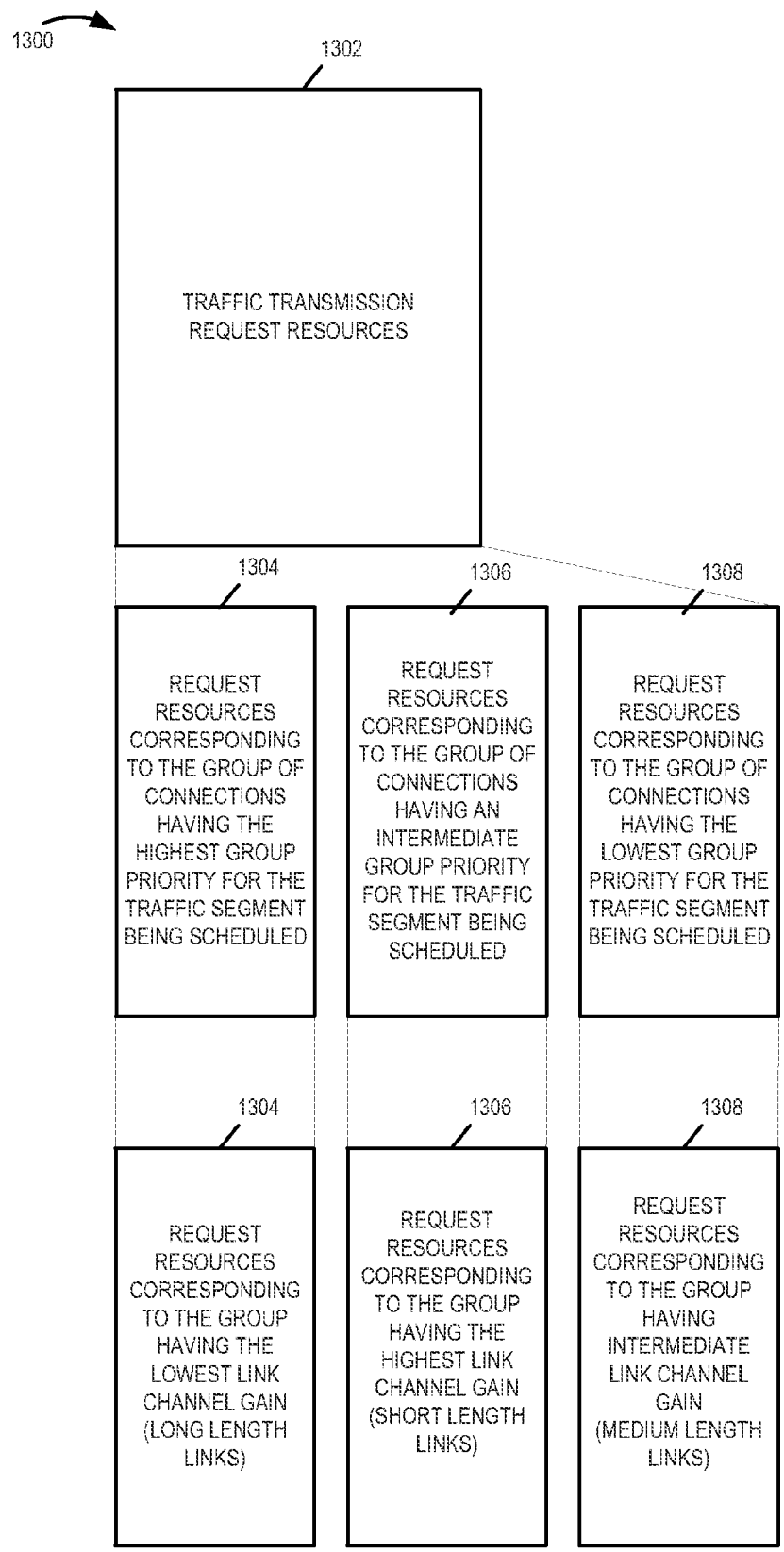
FIG. 13 illustrates still another example of traffic transmission request resources in accordance with an exemplary embodiment.

Drawing 1300 of FIG. 13 illustrates exemplary traffic transmission request resources 1302 in accordance with an exemplary embodiment. Traffic transmission request resources 1302 is, e.g., traffic transmission request resources 904 of FIG. 9. Traffic transmission request resources 1302 includes request resources corresponding to the group of connection having the highest group priority for the traffic segment being scheduled 1304, request resources corresponding to the group of connections having an intermediate group priority for the traffic segment being scheduled 1306 and request resources corresponding to the group of connections having the lowest group priority for the traffic segment being scheduled 1308. In the example of FIG. 13, the request resource block with the highest group priority 1304 corresponds to request resources corresponding to the group having the lowest link channel gain, e.g., the group having the longest link lengths. In the example of FIG. 13, the request resource block with intermediate group priority 1306 corresponds to request resources corresponding to the group having the highest link channel gain, e.g., the group having short length links. In the example of FIG. 13, the request resource block with the lowest group priority 1308 corresponds to request resources corresponding to the group having intermediate link channel gain, e.g., the group having the medium link lengths.

In some embodiments, the group priority with regard to traffic scheduling resources is hopped in accordance with a predetermined hopping scheme known to the wireless communications devices. For example, different traffic scheduling slots in the recurring timing frequency structure of FIG. 6 use different group priority ordering. For example, in one example, traffic scheduling resources for slot 1 610 is mapped to use the group priority ordering in accordance with traffic transmission request resources 1002 of FIG. 10; traffic scheduling resources for slot 2 613 is mapped to use the group priority ordering in accordance with traffic transmission request resources 1102 of FIG. 11; traffic scheduling resources for slot N−1 618 is mapped to use the group priority ordering in accordance with traffic transmission request resources 1202 of FIG. 12; and traffic scheduling resources for slot N 622 is mapped to use the group priority ordering in accordance with traffic transmission request resources 1302 of FIG. 13.

In some embodiments, the group priority ordering is such that there are no instances where request resources corresponding to the group have the lowest channel gain, e.g., the long length link group, is placed to have a group priority between two groups having higher channel quality, e.g., two groups corresponding to shorter length links. For example, in some embodiments, the low link channel gain group sometimes referred to as the long length link group is never placed in the intermediate group priority position in the traffic transmission request resource structure.

In some embodiments, in addition to group priority ordering with regard to request resources, there is a notion of individual priority within the group. In some embodiments, the individual priority within the group of connections is hopped in accordance with a predetermined hopping scheme known to the wireless communications devices.

Figure 14:
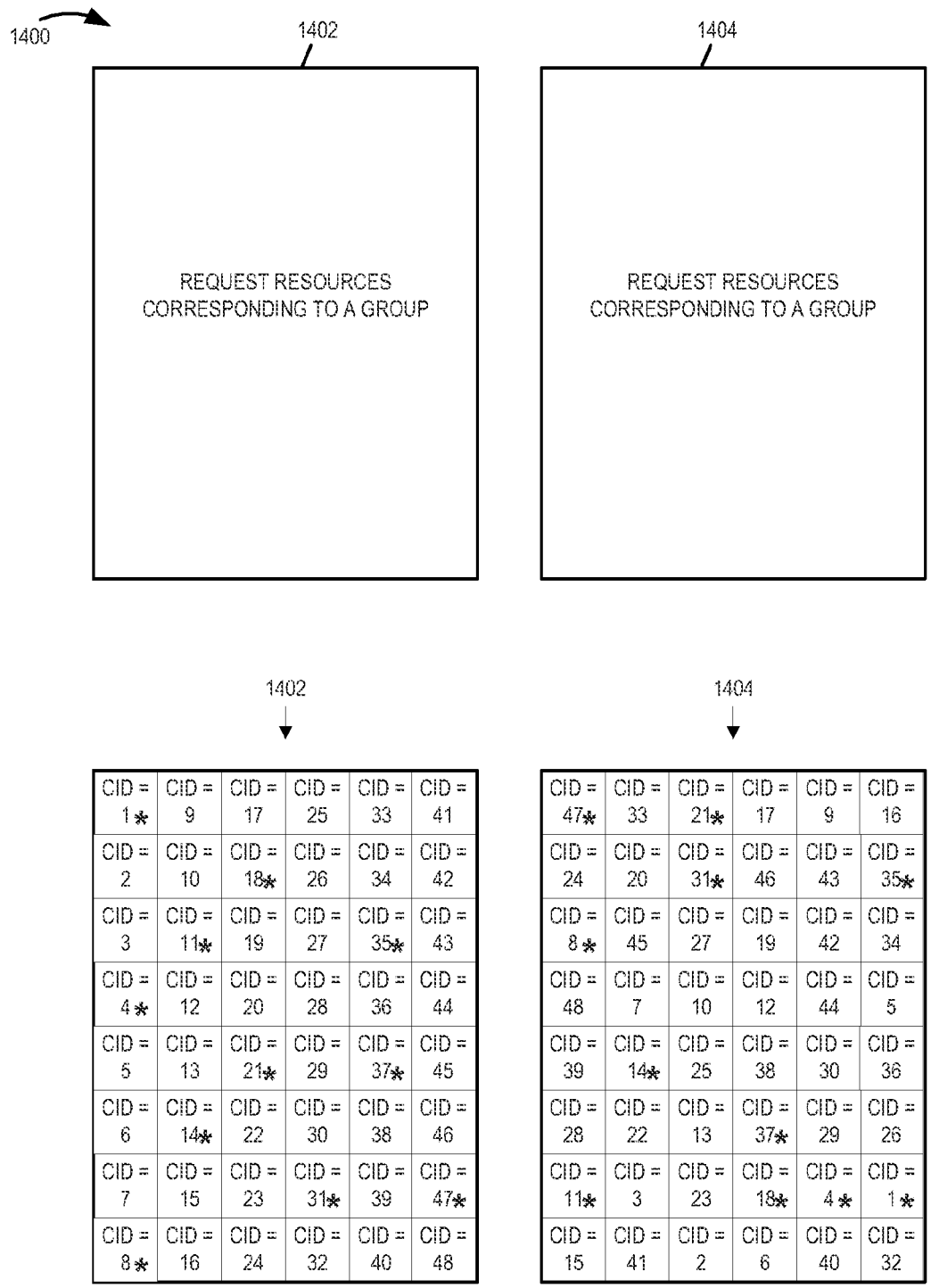
FIG. 14 illustrates priority within a group of request resources corresponding to the group changing over time in accordance with a hopping scheme.

Drawing 1400 of FIG. 14 illustrates exemplary priority within a group and priority hopping within the group. Request resources 1402 is, e.g., any of request resources (908, 910, 912, 1008, 1010, 1012, 1108, 1110, 1112, 1208, 1210, 1212, 1308, 1310, 1312). Request resources corresponding to a group 1402 includes 48 resources corresponding to different CIDs (CID=1, . . . , CID=48). The group is, e.g., one of: (i) a high channel gain group of connections, e.g., a short link length group, (ii) an intermediate channel gain group of connections, e.g., a medium link length group, and (iii) a low channel gain group of connections, e.g., a long link length group. Priority within the block is based on the position of the individual resource with block 1402. The resource corresponding to the highest frequency index and lowest time index, the resource for CID=1, has the highest priority, and the resource having the having the lowest time index and highest time index, the resource for CID=48, has the lowest priority.

Consider that in this example at the time corresponding to FIG. 14, the connections corresponding to CIDs=1, 4, 8, 11, 14, 18, 21, 31, 35, 37, and 47, as indicted by a "*" have been classified, e.g., self-classified, as belonging to this particular group. Then those connections corresponding to CIDs=1, 4, 8, 11, 14, 18, 21, 31, 35, 37, and 47, are allowed to transmit traffic transmission requests in resource block 1402. Those connections that are not in the group are not allowed to transmit in the request resources of the group 1402. In this example, the priority ordering for resource block 1402 for links within the group from highest to lowest is: CID=1, CID=4, CID=8, CID=11, CID=14, CID=18, CID=21, CID=31, CID=35, and CID=37, and CID=47.

Request resources corresponding to a group 1404 includes 48 resources corresponding to different CIDs (CID=1, . . . , CID=48). The group is, e.g., one of: (i) a high channel gain group of connections, e.g., a short link length group, (ii) an intermediate channel gain group of connections, e.g., a medium link length group, and (iii) a low channel gain group of connections, e.g., a long link length group. Consider that the group is the same group described with respect to block 1402. Priority within the block is based on the position of the individual resource with block 1404. The resource corresponding to the highest frequency index and lowest time index, the resource for CID=47, has the highest priority, and the resource having the lowest time index and highest time index, the resource for CID=32, has the lowest priority.

Consider that in this example at the time corresponding to FIG. 14, the connections corresponding to CIDs=1, 4, 8, 11, 14, 18, 21, 31, 35, 37, and 47, as indicted by a "*" have been classified, e.g., self-classified, as belonging to this group. The group classification did not change from block 1402 to block 1404. Then those connections corresponding to CIDs=1, 4, 8, 11, 14, 18, 21, 31, 35, 37, and 47, are allowed to transmit traffic transmission requests in resource block 1404. Those connections that are not in the group are not allowed to transmit in the request resources of the group 1404. In this example, the priority ordering for resource block 1404 for links within the group from highest to lowest is: CID=47, CID=8, CID=11, CID=14, CID=21, CID=31, CID=37, CID=18, CID=4, CID=35, and CID=1.

In this example of FIG. 14, each CID has a dedicated predetermined resource in each request block. Resource use is dependent upon which group the link has self-assigned itself to. In other embodiments, connections within a particular group may select, e.g., pseudo-randomly, from among a set of resources that may be used by the group members but may not be used by members belonging to different groups. In some such embodiments, the request signals include information identifying the connection identifier.

Figure 15:
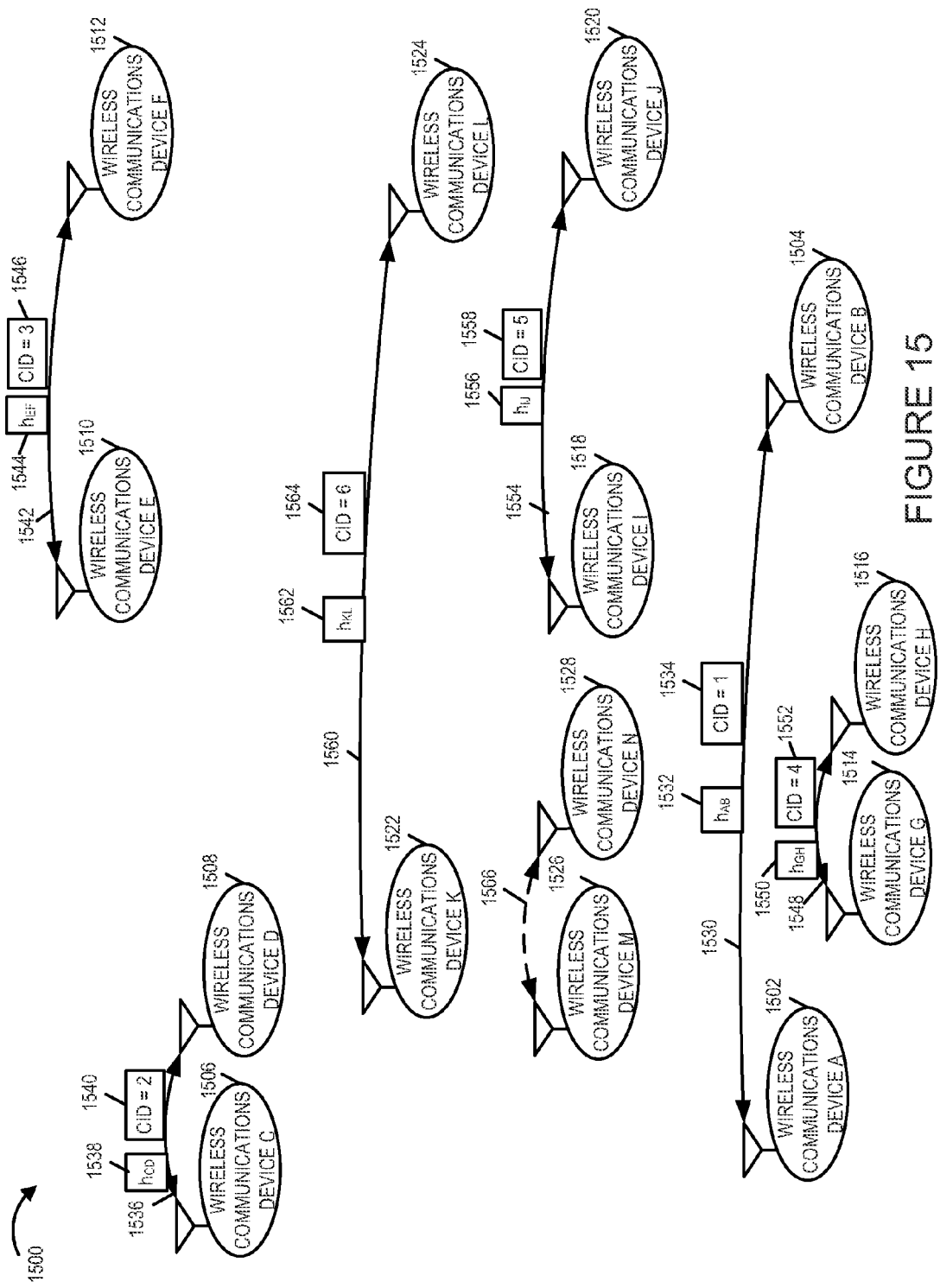
FIG. 15 illustrates existing links in a peer to peer communications system and a pair of devices which would like to form a link in accordance with an exemplary embodiment.

Drawing 1500 of FIG. 15 illustrates a plurality of mobile wireless communications devices (wireless communications device A 1502, wireless communications device B 1504, wireless communications device C 1506, wireless communications device D 1508, wireless communications device E 1510, wireless communications device F 1512, wireless communications device G 1514, wireless communications device H 1516, wireless communications device I 1518, wireless communications device J 1520, wireless communications device K 1522, wireless communications device L 1524, wireless communications device M 1526, wireless communications device N 1528) in accordance with an exemplary embodiment. The wireless communications devices (1502, 1504, 1506, 1508, 1510, 1512, 1514, 1516, 1520, 1522, 1524, 1526, 1528) are, e.g., any of the device of system 100 of FIG. 1 and/or implemented in accordance with flowchart 200 of FIG. 2, device 300 of FIG. 3 and/or assembly of modules 400 of FIG. 4.

Device A 1502 has an existing link 1530 with device B 1504. Link 1530 has a channel gain $h_{AB}$ 1532. Device A 1502 has previously acquired CID=1 which is currently being used for link 1530. Specific air link resources are associated with CID=1, e.g., specific CID broadcast resources and specific traffic scheduling resources, in the recurring peer to peer timing frequency structure being used in the system.

Device C 1506 has an existing link 1536 with device D 1508. Link 1536 has a channel gain $h_{CD}$ 1538. Device C 1506 has previously acquired CID=2 which is currently being used for link 1536. Specific air link resources are associated with CID=2, e.g., specific CID broadcast resources and specific traffic scheduling resources, in the recurring peer to peer timing frequency structure being used in the system.

Device E 1510 has an existing link 1542 with device F 1512. Link 1542 has a channel gain $h_{EF}$ 1544. Device E 1510 has previously acquired CID=3 which is currently being used for link 1542. Specific air link resources are associated with CID=3, e.g., specific CID broadcast resources and specific traffic scheduling resources, in the recurring peer to peer timing frequency structure being used in the system.

Device G 1514 has an existing link 1548 with device H 1516. Link 1548 has a channel gain $h_{GH}$ 1550. Device G 1514 has previously acquired CID=4 which is currently being used for link 1548. Specific air link resources are associated with CID=4, e.g., specific CID broadcast resources and specific traffic scheduling resources, in the recurring peer to peer timing frequency structure being used in the system.

Device I 1518 has an existing link 1554 with device J 1520. Link 1554 has a channel gain $h_{IJ}$ 1556. Device I 1518 has previously acquired CID=5 which is currently being used for link 1554. Specific air link resources are associated with CID=5, e.g., specific CID broadcast resources and specific traffic scheduling resources, in the recurring peer to peer timing frequency structure being used in the system.

Device K 1552 has an existing link 1560 with device L 1524. Link 1560 has a channel gain $h_{KL}$ 1562. Device K 1522 has previously acquired CID=6 which is currently being used for link 1560. Specific air link resources are associated with CID=6, e.g., specific CID broadcast resources and specific traffic scheduling resources, in the recurring peer to peer timing frequency structure being used in the system.

Device M 1526 would like to establish link 1566 with device N 1528.

Figure 16:
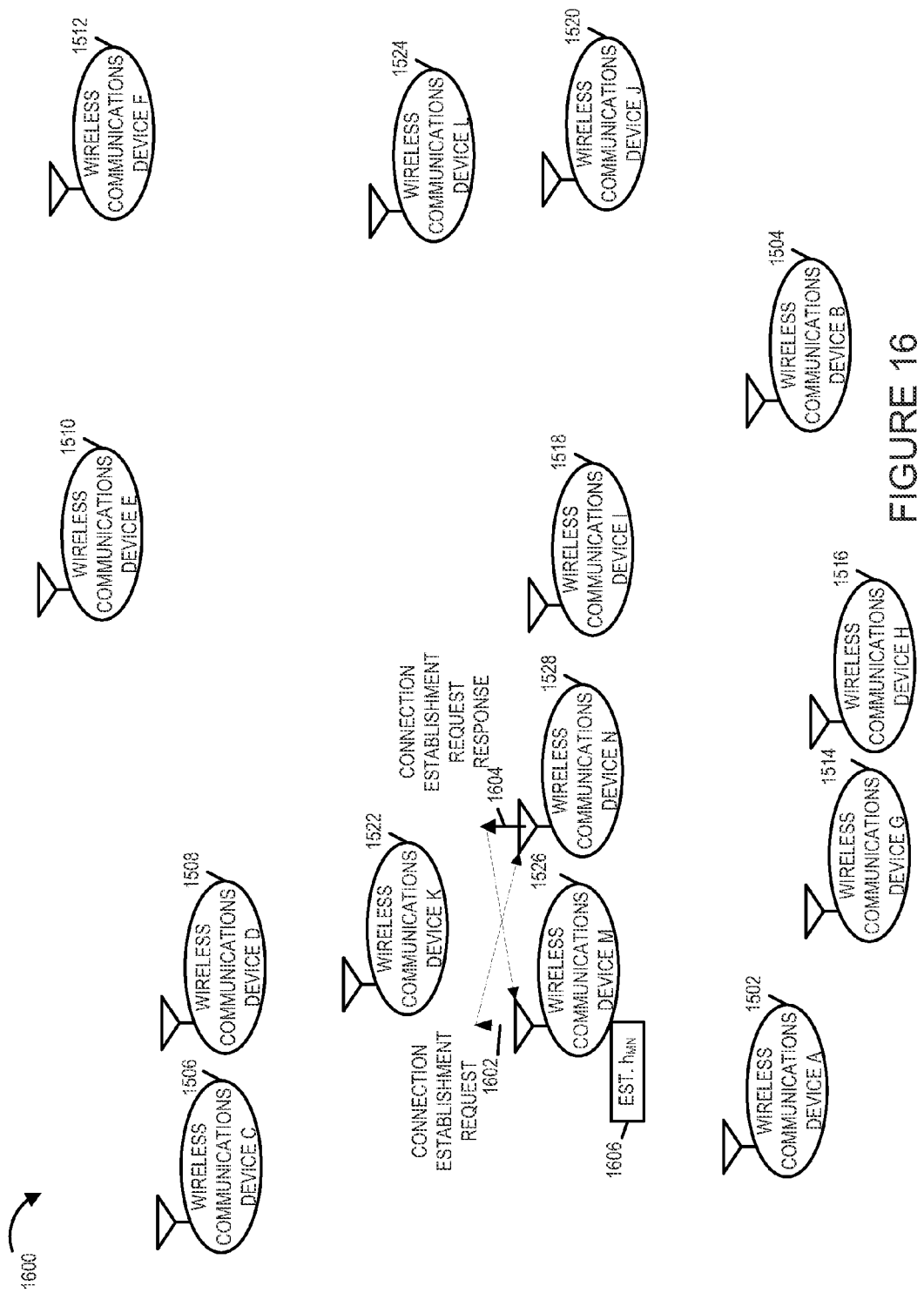
FIG. 16 illustrates exemplary connection establishment signaling in accordance with an exemplary embodiment.

Drawing 1600 of FIG. 16 illustrates that the wireless communications device M 1526 generates and transmits connection establishment request signal 1602. Device N 1528 receives connection establishment request signal 1602 and generates and transmits connection establishment request response signal 1604. Device M receives signal 1604 and measures the received power of signal 1604. Wireless communications device M estimates the channel gain $h_{MN}$ 1606 for the link between device M 1526 and device N 1528 based on the received power level of signal 1604 and/or based on information communicated in signal 1604.

Figure 17:
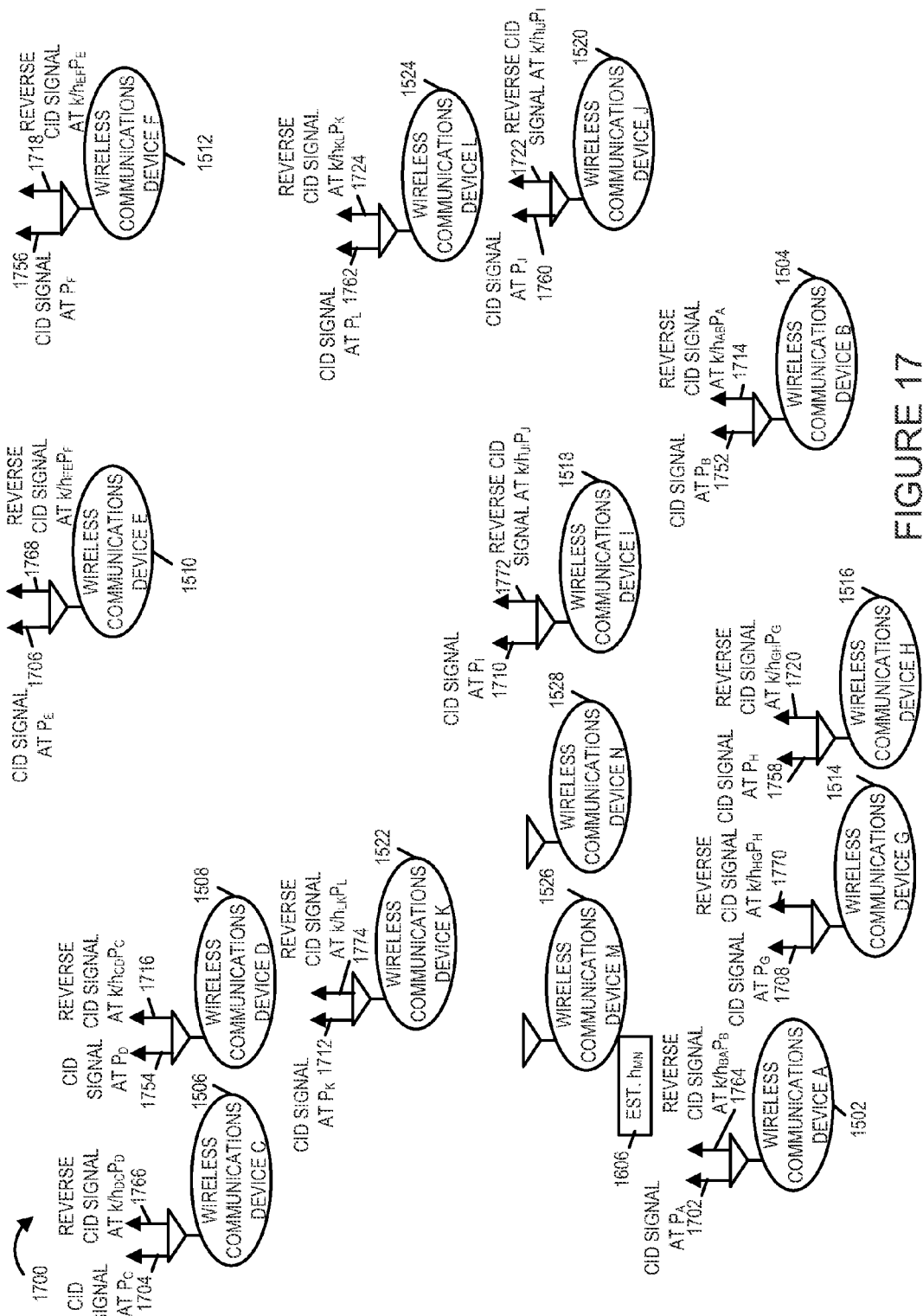
FIG. 17 illustrates exemplary CID broadcast signaling and exemplary reverse CID broadcast signaling corresponding to existing links in accordance with an exemplary embodiment.

Drawing 1700 of FIG. 17 illustrates exemplary signaling broadcast by wireless communications devices of existing links using connection identifier broadcast resources in accordance with an exemplary embodiment. Device A 1502 generates and transmits CID signal 1702 at power level $P_A$ using a resource for CID=1 in the forward connection identifier broadcast resource block. Device B 1504 receives signal 1702, measures the received power of signal 1702, and, in response transmits reverse CID signal 1714 at power level $k/(h_{AB}P_A)$ using a resource for CID=1 in the reverse connection identifier broadcast resource block.

Device C 1506 generates and transmits CID signal 1704 at power level $P_C$ using a resource for CID=2 in the forward connection identifier broadcast resource block. Device D 1508 receives signal 1704, measures the received power of signal 1704, and, in response transmits reverse CID signal 1716 at power level $k/(h_{CD}P_C)$ using a resource for CID=2 in the reverse connection identifier broadcast resource block.

Device E 1510 generates and transmits CID signal 1706 at power level $P_E$ using a resource for CID=3 in the forward connection identifier broadcast resource block. Device F 1512 receives signal 1706, measures the received power of signal 1706, and, in response transmits reverse CID signal 1718 at power level $k/(h_{EF}P_E)$ using a resource for CID=3 in the reverse connection identifier broadcast resource block.

Device G 1514 generates and transmits CID signal 1708 at power level $P_G$ using a resource for CID=4 in the forward connection identifier broadcast resource block. Device H 1516 receives signal 1708, measures the received power of signal 1708, and, in response transmits reverse CID signal 1720 at power level $k/(h_{GH}P_G)$ using a resource for CID=4 in the reverse connection identifier broadcast resource block.

Device I 1518 generates and transmits CID signal 1710 at power level $P_I$ using a resource for CID=5 in the forward connection identifier broadcast resource block. Device J 1520 receives signal 1710, measures the received power of signal 1710, and, in response transmits reverse CID signal 1722 at power level $k/(h_{IJ}P_I)$ using a resource for CID=5 in the reverse connection identifier broadcast resource block.

Device K 1522 generates and transmits CID signal 1712 at power level $P_K$ using a resource for CID=6 in the forward connection identifier broadcast resource block. Device L 1524 receives signal 1522, measures the received power of signal 1712, and, in response transmits reverse CID signal 1722 at power level $k/(h_{KL}P_K)$ using a resource for CID=6 in the reverse connection identifier broadcast resource block.

Device B 1504 generates and transmits CID signal 1752 at power level $P_B$ using a resource for CID=1 in the forward connection identifier broadcast resource block. Device A 1501 receives signal 1752, measures the received power of signal 1752, and, in response transmits reverse CID signal 1764 at power level $k/(h_{BA}P_B)$ using a resource for CID=1 in the reverse connection identifier broadcast resource block.

Device D 1508 generates and transmits CID signal 1754 at power level $P_D$ using a resource for CID=2 in the forward connection identifier broadcast resource block. Device C 1506 receives signal 1754, measures the received power of signal 1754, and, in response transmits reverse CID signal 1766 at power level $k/(h_{DC}P_D)$ using a resource for CID=2 in the reverse connection identifier broadcast resource block.

Device F 1512 generates and transmits CID signal 1756 at power level $P_F$ using a resource for CID=3 in the forward connection identifier broadcast resource block. Device E 1512 receives signal 1756, measures the received power of signal 1756, and, in response transmits reverse CID signal 1768 at power level $k/(h_{FE}P_F)$ using a resource for CID=3 in the reverse connection identifier broadcast resource block.

Device H 1516 generates and transmits CID signal 1758 at power level $P_H$ using a resource for CID=4 in the forward connection identifier broadcast resource block. Device G 1514 receives signal 1758, measures the received power of signal 1758, and, in response transmits reverse CID signal 1770 at power level $k/(h_{HG}P_H)$ using a resource for CID=4 in the reverse connection identifier broadcast resource block.

Device J 1520 generates and transmits CID signal 1760 at power level $P_j$ using a resource for CID=5 in the forward connection identifier broadcast resource block. Device I 1518 receives signal 1760, measures the received power of signal 1760, and, in response transmits reverse CID signal 1772 at power level $k/(h_{JI}P_J)$ using a resource for CID=5 in the reverse connection identifier broadcast resource block.

Device L 1524 generates and transmits CID signal 1762 at power level $P_L$ using a resource for CID=6 in the forward connection identifier broadcast resource block. Device K 1522 receives signal 1562, measures the received power of signal 1762, and, in response transmits reverse CID signal 1772 at power level $k/(h_{LK}P_L)$ using a resource for CID=6 in the reverse connection identifier broadcast resource block.

Figure 18:
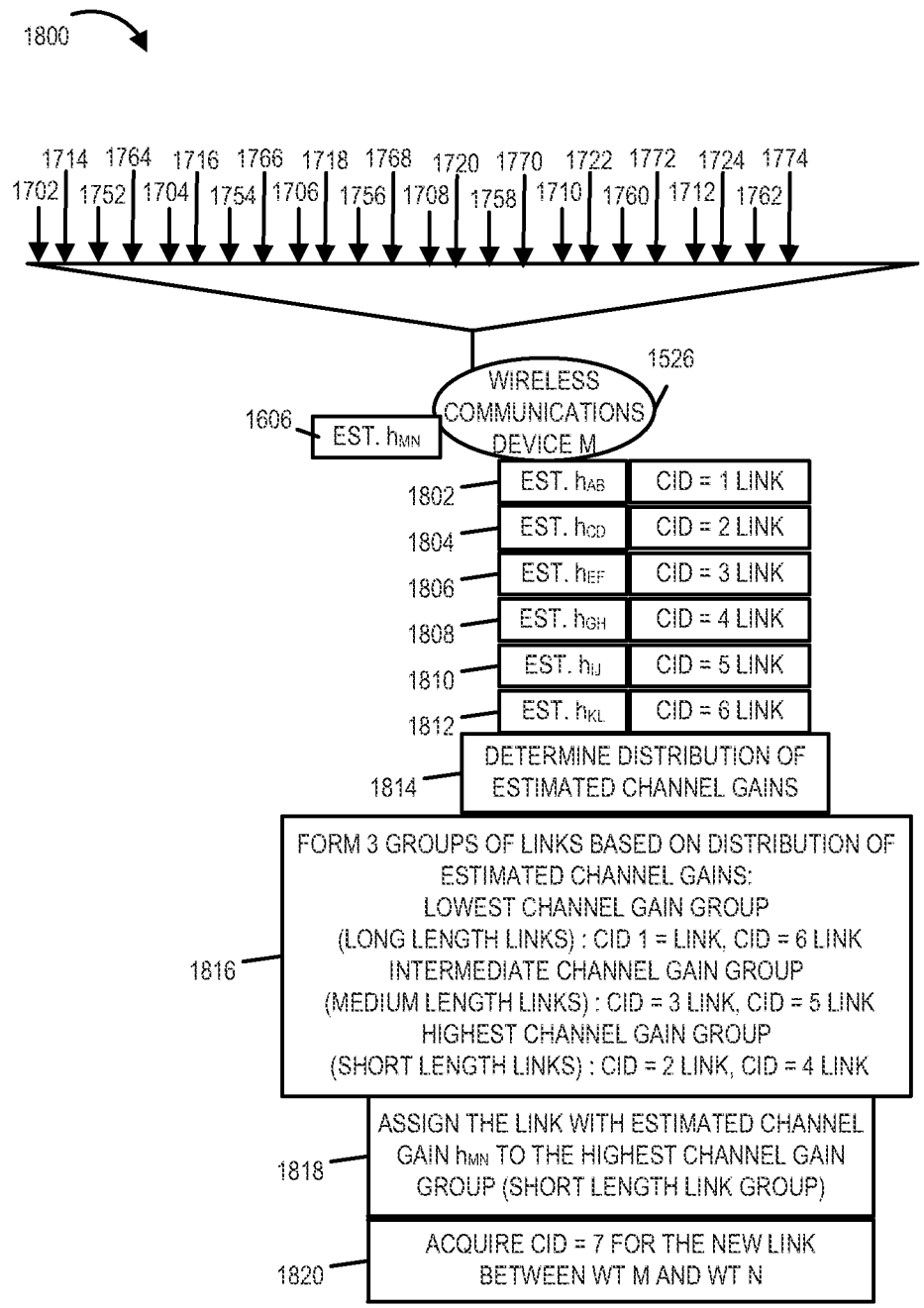
FIG. 18 illustrates an exemplary wireless communications device using the signaling of FIG. 17 to estimate link channel gains of existing links, determine a distribution of estimated channel gains, form groups based on the channel gain distribution, and assign the new link to one of the groups.

Drawing 1800 of FIG. 18 illustrates exemplary steps performed by wireless communications device M 1526 in accordance with an exemplary embodiment. Device M 1526 receives the CID signals (1702, 1704, 1706, 1708, 1710, 1712, 1752, 1754, 1756, 1758, 1760, 1762) and measures the received power of the received signals. Device M 1526 also receives the reverse CID signals (1714, 1716, 1718, 1720, 1722, 1724, 1764, 1766, 1768, 1770, 1772, 1724) and measures the received power of the received signals. Because of the relationship between the transmitted power of a CID signal and the transmit power of a corresponding reverse CID signal, device M 1526 is able to estimate the channel gain for each of the existing links. In some embodiments, wireless device M 1526 uses a received connection identifier signal and a received reverse connection identifier signal transmitted from the same node of a link, e.g., the same endpoint of the link, to estimate the channel gain for a particular link. In some other embodiments, wireless device M 1526 uses received connection identifier signals and a received reverse connection identifier signals transmitted from both nodes of a link to estimate the channel gain for a particular link. In various embodiments, wireless device M 1526 considers that the channel gain for a particular link is the same in both directions, e.g., $h_{AB}$ is approximately the same as $h_{BA}$ for the purposes of estimating channel gain for a particular link. In some embodiments, each of the CID signals are transmitted at the same power level. In some both CID signals for a particular link are transmitted at the same power level, e.g. $P_A=P_B$. In some embodiments, a CID signal is transmitted at one of a plurality of alternative power level. In some such embodiments, information identifying which one of the alternative power levels a CID is transmitted at is communicated by the CID signal.

Wireless device M 1526 estimates link channel gain $h_{AB}$ 1802 corresponding to the link using CID=1 based on received signals (1702, 1714) or based on received signals (1752, 1764) or based on received signals (1702, 1714, 1752, 1764). Wireless device M 1526 estimates link channel gain $h_{CD}$ 1804 corresponding to the link using CID=2 based on received signals (1704, 1716) or based on received signals (1754, 1766) or based on received signals (1704, 1716, 1754, 1756). Wireless device M 1526 estimates link channel gain $h_{EF}$ 1806 corresponding to the link using CID=3 based on received signals (1706, 1718) or based on received signals (1756, 1768) or based on received signals (1706, 1718, 1756, 1768). Wireless device M 1526 estimates link channel gain $h_{GH}$ 1808 corresponding to the link using CID=4 based on received signals (1708, 1720) or based on received signals (1758, 1770) or based on received signals (1708, 1720, 1758, 1770). Wireless device M 1526 estimates link channel gain $h_{IJ}$ 1810 corresponding to the link using CID=5 based on received signals (1710, 1722) or based on received signals (1760, 1772) or based on received signals (1710, 1722, 1760, 1772). Wireless device M 1526 estimates link channel gain $h_{KL}$ 1812 corresponding to the link using CID=6 based on received signals (1712, 1724) or based on received signals (1762, 1774) or based on received signals (1712, 1724, 1762, 1774).

Wireless communications device M 1526 determines a distribution of the estimated channel gains as indicated by block 1814. Wireless communications device M 1526 forms 3 groups of links based on the distribution of the estimated channel gains, as indicated by block 1816. In this example, the lowest gain channel group, sometimes referred to as the long length link group, includes the CID=1 link and the CID=6 link. In this example, the intermediate gain channel group, sometimes referred to as the medium length link group, includes the CID=3 link and the CID=5 link. In this example, the highest gain channel group, sometimes referred to as the short length link group, includes the CID=2 link and the CID=4 link.

Wireless communications device M 1526 assigns its own link with estimated channel gain $h_{MN}$ to the highest channel gain group, sometimes referred to as the short length link group based on the gain $h_{MN}$ relative to the estimated gains of the other links, as indicated by block 1818. Wireless communications device M 1526 acquires CID=7 for the new link between M and N. Subsequently the devices M 1526 and N 1528 will use air link resources associated with CID=7. For example, device M 1526 will use a forward CID signaling broadcast resource corresponding to CID=7 and device N 1528 will use a reverse CID signaling broadcast resource corresponding to CID=7, in a similar manner as the other connections use their resources as described in FIG. 16. Similarly, device N 1528 will use a forward CID signaling broadcast resource corresponding to CID=7 and device M 1526 will use a reverse CID signaling broadcast resource corresponding to CID=7, in a similar manner as the other connections use their resources as described in FIG. 16. Device M 1526 may, and sometimes does use a traffic transmission request resource corresponding to the high channel gain group and corresponding to CID=7. Device N 1528 may, and sometimes does use a traffic transmission request response resource corresponding to the high channel gain group and corresponding to CID=7. Device N 1528 may, and sometimes does use a traffic transmission request resource corresponding to the high channel gain group and corresponding to CID=7. Device M 1526 may, and sometimes does use a traffic transmission request response resource corresponding to the high channel gain group and corresponding to CID=7.

Figure 19:
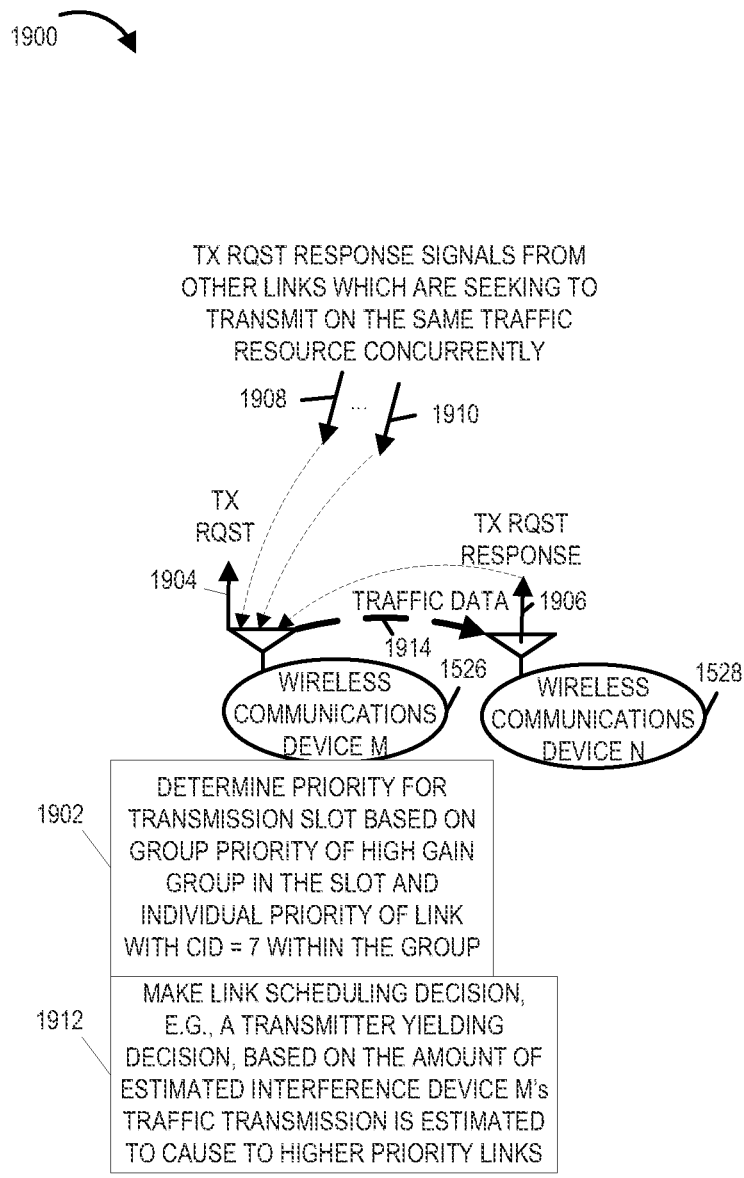
FIG. 19 illustrates an exemplary traffic transmission scheduling decision for a traffic slot in accordance with an exemplary embodiment.

Drawing 1900 of FIG. 19 illustrates exemplary wireless communications device M 1526 making a traffic transmission scheduling decision. Consider that device M 1526 wants to transmit peer to peer traffic signals to device N 1528 in the traffic slot. Device M 1526 determines the priority for the transmission slot based on the group priority of the high gain group in the slot and the individual priority of link with CID=7 within the high gain group to which it belongs, as indicated by block 1902. A particular traffic request resource corresponds to this combination of group priority and priority within the group. Wireless communications device M 1526 transmits transmission request signal 1904 using the transmission request resource corresponding to its CID, CID=7, and selected group, which is the high channel gain group sometimes referred to as the short length link group. Wireless communications device N 1528 receives signal 1904 and transmits transmission request response signal 1906. Wireless communications device M 1526 receives transmission request response signal 1906 and transmission request response signals (1908, . . . , 1910) from other links which are seeking to transmit on the same traffic resource concurrently. Device M 1526 makes a link scheduling decision, e.g., a transmitter yielding decision, based on the amount of estimated interference device M's traffic transmission is estimated to cause to higher priority links. If device M 1526 decides not to yield and to proceed with its intended traffic transmission, device M generates and transmits traffic data signals 1914.

Wireless device M 1526 may, and sometimes does, make links scheduling decision for a plurality of traffic slots. Wireless device M 1526 holds the same CID, CID=7 for multiple traffic slots and remains assigned to the same channel gain based group, e.g., the high channel link gain based group for multiple traffic slots. However, the relative priority of the link between device M and N may, and sometimes does change from one slot to another in accordance with predetermined group hopping and/or in accordance with predetermined hopping within a group, e.g., in accordance with a hopping function or functions.

At a later point in time device M 1526 performs a reevaluation of conditions, e.g., estimating its current channel link gain, estimating channel link gains of other links, determining distributions of estimated channel link gains, forming 3 new groups of links based on the distribution of estimated channel gains, and assigning its own link to one of the groups. Thus device M 1526 may, and sometimes does, reassign its link with CID=7, to another group, e.g., a low channel gain group or an intermediate channel gain group. Device M 1526 would then subsequently hold the new assignment for multiple traffic slots. In various embodiments, the ranges of the different groups may, and sometimes do, change over time.

Figure 20:
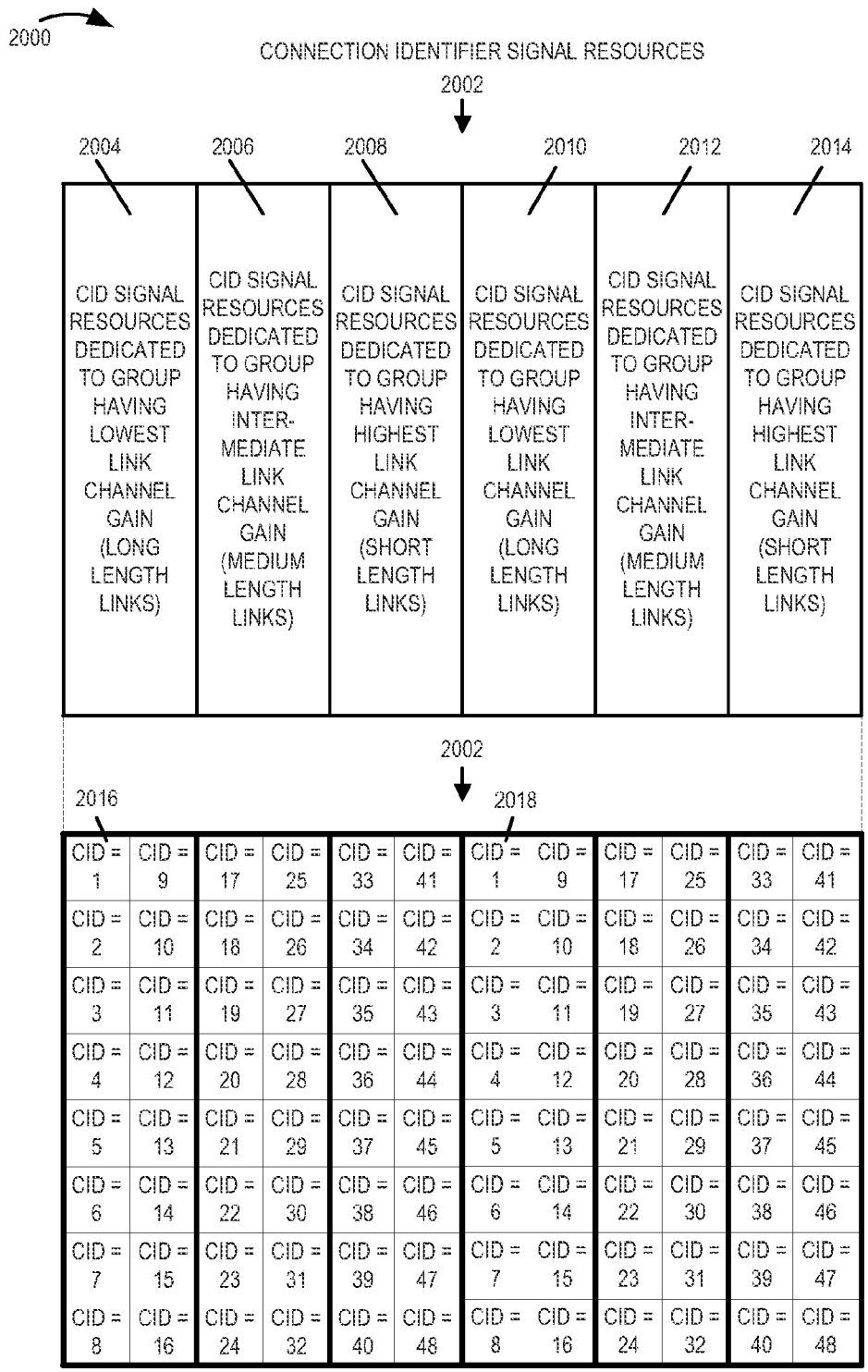
FIG. 20 illustrates exemplary partitioning of connection identifier signal resources in accordance with an exemplary embodiment.

Drawing 2000 of FIG. 20 illustrates exemplary partitioning of the connection identifier signaling resources 2002 in accordance with an exemplary embodiment. Exemplary connection identifier signaling resources 2002 are, e.g., connection identifier signaling resources 702 of FIG. 7. CID signal resources 2002 includes: CID resources dedicated to the group having the lowest link channel gain, sometimes referred to as the long length link group 2004, CID resources dedicated to the group having intermediate link channel gain, sometimes referred to as the medium length link group 2006, CID resources dedicated to the group having the high link channel gain, sometimes referred to as the short length link group 2008, CID resources dedicated to the group having the lowest link channel gain, sometimes referred to as the long length link group 2010, CID resources dedicated to the group having intermediate link channel gain, sometimes referred to as the medium length link group 2012, and CID resources dedicated to the group having the high link channel gain, sometimes referred to as the short length link group 2014.

In this example, there are 96 individual resources units in CID signaling resources 2002, and each different connection identifier (CID=1, CID=2, . . . , CID=48) corresponds to two individual resource units in block 2002. In this example, specific CIDs are associated with specific groups in accordance with a predetermined mapping. CID=1 through CID=16 correspond to the low link channel gain group. CID=17 through CID=32 correspond to the intermediate link channel gain group. CID=33 through CID=48 correspond to the high link channel gain group.

If a wireless communications device wants to establish a peer to peer link and acquire a CID, the wireless communications device selects a CID from the unused CIDs in the group to which it seeks to join. The wireless communications device selects which group to join based on its own channel link gain and the estimated channel gains of existing links.

Figure 21:
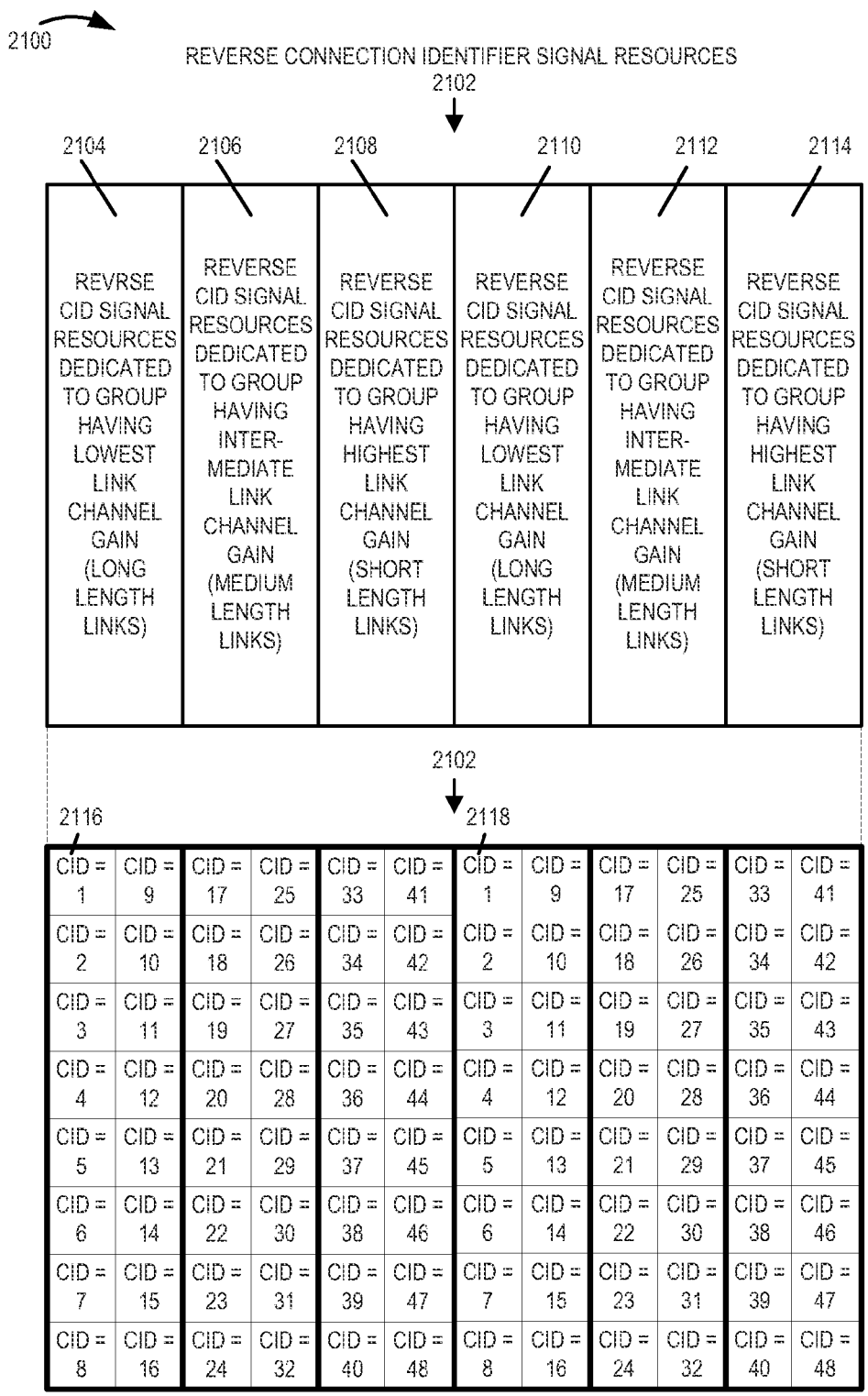
FIG. 21 illustrates exemplary partitioning of reverse connection identifier signal resources in accordance with an exemplary embodiment.

Drawing 2100 of FIG. 21 illustrates exemplary partitioning of the reverse connection identifier signal resources 2102 in accordance with an exemplary embodiment. Exemplary reverse connection identifier signaling resources 2102 are, e.g., reverse connection identifier signaling resources 704 of FIG. 7. Reverse CID signal resources 2102 includes: reverse CID resources dedicated to the group having the lowest link channel gain, sometimes referred to as the long length link group 2104, reverse CID resources dedicated to the group having intermediate link channel gain, sometimes referred to as the medium length link group 2106, reverse CID resources dedicated to the group having the high link channel gain, sometimes referred to as the short length link group 2108, reverse CID resources dedicated to the group having the lowest link channel gain, sometimes referred to as the long length link group 2110, reverse CID resources dedicated to the group having intermediate link channel gain, sometimes referred to as the medium length link group 2112, and reverse CID resources dedicated to the group having the high link channel gain, sometimes referred to as the short length link group 2114.

In this example, there are 96 individual resources units in reverse CID signaling resources 2102, and each different connection identifier (CID=1, CID=2, . . . , CID=48) corresponds to two individual resource units in block 2102. In this example, specific CIDs are associated with specific groups in accordance with a predetermined mapping. CID=1 through CID=16 correspond to the low link channel gain group. CID=17 through CID=32 correspond to the intermediate link channel gain group. CID=33 through CID=48 correspond to the high link channel gain group.

For each resource, associated with a CID, in forward CID resources 2002, there is a corresponding resource in reverse connection identifier resources 2102, associated with the same CID. In some embodiments, a forward CID resource associated with a particular CID, e.g., resource 2016 associated with CID=1 is used to carry a connection identifier broadcast signal from one device in the pair of devices corresponding to the connection having connection identifier CID=1; and a reverse CID resource associated with a particular CID, e.g., resource 2116 associated with CID=1 is used to carry a reverse connection identifier broadcast signal from the other device in the pair of devices corresponding to the connection having connection identifier CID=1. The reverse connection identifier broadcast signal is a response to a connection identifier broadcast signal. In some embodiments, the reverse connection identifier signal is transmitted at a power level inversely proportional to the power level at which the corresponding forward CID broadcast signal is received by the device which broadcasts the reverse CID signal.

For CID=1, a first resource pair is forward CID resource 2016 and reverse CID resource 2116. For CID=1, a second resource pair is forward resource 2018 and reverse CID resource 2118. Thus both ends of a link can transmit both a CID signal and a reverse CID signal.

In other embodiments, there may be a different number of CIDs used in the system. In some embodiments, an individual resource unit corresponding to a CID, e.g., resource unit 2016 corresponding to CID=1 or resource unit 2116 corresponding to CID=1, is a single OFDM tone-symbol which represents one OFDM tone for 1 OFDM symbol transmission time interval.

Figure 22:
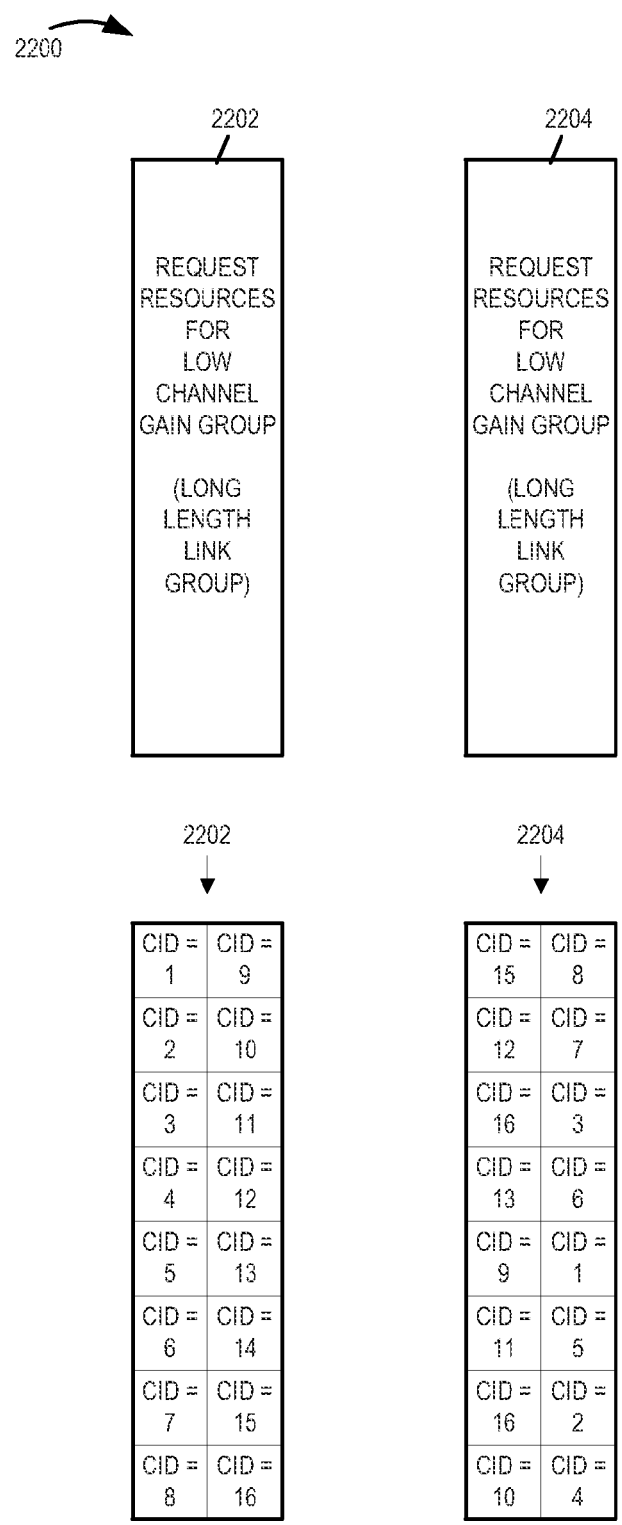
FIG. 22 illustrates exemplary priority within a group and priority hopping within the group.

Drawing 2200 of FIG. 22 illustrates exemplary priority within a group and priority hopping within the group. Request resources 2202 for low channel gain group is, e.g., any of request resources (1108, 1208, 1304). Request resources corresponding to a group 2202 includes 16 resources corresponding to different CIDs used by the group (CID=1, . . . , CID=16). The group is a low channel gain group of connections, e.g., a long link length group. Priority within the block is based on the position of the individual resource with block 2202. The resource corresponding to the highest frequency index and lowest time index, the resource for CID=1, has the highest priority, and the resource having the having the lowest time index and highest time index, the resource for CID=16, has the lowest priority.

Request resources 2204 for the low channel group includes 16 resources corresponding to different CIDs used by the group (CID=1, . . . , CID=48). Consider Request resources 2204 for low channel gain group is, e.g., any of request resources (1108, 1208, 1304). Consider that the group is the same group described with respect to block 2202. Priority within the block is based on the position of the individual resource with block 2204. The resource corresponding to the highest frequency index and lowest time index, the resource for CID=15, has the highest priority, and the resource having the lowest time index and highest time index, the resource for CID=4, has the lowest priority.

FIG. 22 has been described with respect to the low link channel gain group. The same approach, of priority hopping within a group, applies to the high link channel gain group and the intermediate channel link channel gain group. With the high link channel gain group the request resources are, e.g., any of request resources (1104, 1206, 1306) and the CIDs used by the group are (CID=33, . . . , CID=48). With the intermediate link channel gain group the request resources are, e.g., any of request resources (1106, 1204, 1308) and the CIDs used by the group are (CID=16, . . . , CID=32).

Various methods and apparatus described in this application are well suited for use in wireless communications devices and networks supporting peer to peer signaling. In various embodiments a device of any of one or more of FIGS. 1-22 includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the wireless communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile wireless communications devices, e.g., mobile nodes such as mobile terminals, stationary wireless communications devices such as access points such as base stations, network nodes and/or communications systems. Various embodiments are also directed to methods, e.g., method of controlling and/or operating wireless communications devices such as mobile nodes and/or stationary nodes, access points such as base stations network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device supporting peer to peer signaling, including a processor configured to implement one, multiple or all of the steps of one or more methods of the invention.

In some embodiments, the processor or processors, e.g., CPUs, of one or more devices, e.g., communications nodes such as wireless terminals, access nodes, and/or network nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first wireless communications device in an ad hoc network to perform link transmission scheduling for a first link, the method comprising:
   estimating link channel gain for each of a plurality of links in said ad hoc network;
   assigning the first link to one of a plurality of different groups of links according to an estimated channel gain of the first link relative to estimated channel gains of other links;
   determining priority of the first link for a first time period based on a link identifier corresponding to the first link and the group of links to which the first link was assigned; and
   making a first link scheduling decision for the first time period as a function of the determined priority of the first link.

2. The method of claim 1,
   wherein said plurality of different groups includes a first group of links, links in said first group corresponding to a first channel gain range; and
   wherein said plurality of different groups includes a second group of links, links in said second group corresponding to a second channel gain range, said second channel gain range having a higher gain than said first channel gain range.

3. The method of claim 2, wherein estimating includes determining the channel gain for an individual link from i) the received power of a connection identifier signal corresponding to the individual link transmitted by a first node, which corresponds to a first end of said individual link and ii) the received power of a reverse connection identifier signal corresponding to the individual link, said reverse connection identifier signal transmitted by said first node.

4. The method of claim 2, wherein the priority of the different link groups is based on channel gain, the priority of a group of low gain links not falling between the priority of links corresponding to different groups of links having higher gains.

5. The method of claim 1, wherein making a first link scheduling decision includes making a transmission yielding decision as a function of the priority of said first link relative to the priority of at least one other link seeking to transmit in the first time period.

6. The method of claim 5, wherein said transmission yielding decision is whether or not to transmit based on the interference which may be caused to said another link.

7. The method of claim 1, further comprising:
   determining the distribution of estimated channel gains for links in said plurality of links; and
   wherein said assigning the first link to one of a plurality of different groups of links according to an estimated channel gain of the first link relative to the estimated channel gains of other links is based on the position of the estimated gain of the first link within the distribution of estimated channel gains.

8. The method of claim 1, further comprising:
   wherein said assigning the first link to one of a plurality of different groups of links according to an estimated channel gain of the first link relative to the estimated channel gains of other links is based on the value of the estimated channel gain of the first link relative to one or more group gain ranges.

9. A first wireless communications device in an ad hoc network, the first wireless communications device comprising:
   means for estimating link channel gain for each of a plurality of links in said ad hoc network;
   means for assigning a first link to one of a plurality of different groups of links according to an estimated channel gain of the first link relative to estimated channel gains of other links;
   means for determining priority of the first link for a first time period based on a link identifier corresponding to the first link and the group of links to which the first link was assigned; and
   means for making a first link scheduling decision for the first time period as a function of the determined priority of the first link.

10. The first wireless communications device of claim 9,
    wherein said plurality of different groups includes a first group of links, links in said first group corresponding to a first channel gain range; and
    wherein said plurality of different groups includes a second group of links, links in said second group corresponding to a second channel gain range, said second channel gain range having a higher gain than said first channel gain range.

11. The first wireless communications device of claim 10, wherein said means for estimating includes means for determining the channel gain for an individual link from i) the received power of a connection identifier signal corresponding to the individual link transmitted by a first node, which corresponds to a first end of said individual link and ii) the received power of a reverse connection identifier signal corresponding to the individual link, said reverse connection identifier signal transmitted by said first node.

12. The first wireless communications device of claim 10, wherein the priority of the different link groups is based on channel gain, the priority of a group of low gain links not falling between the priority of links corresponding to different groups of links having higher gains.

13. The first wireless communications device of claim 9, further comprising:
    means for determining the distribution of estimated channel gains for links in said plurality of links; and
    wherein said means for assigning the first link to one of a plurality of different groups of links according to an estimated channel gain of the first link relative to the estimated channel gains of other links bases the assigning on the position of the estimated gain of the first link within the distribution of estimated channel gains.

14. The first wireless communications device of claim 9,
    wherein said means for assigning the first link to one of a plurality of different groups of links according to an estimated channel gain of the first link relative to the estimated channel gains of other links bases the assigning on the value of the estimated channel gain of the first link relative to one or more group gain ranges.

15. A computer program product for use in a first wireless communications device in an ad hoc network, the computer program product comprising:
   a non-transitory computer readable medium comprising:
      code for causing at least one computer to estimate link channel gain for each of a plurality of links in said ad hoc network;
      code for causing said at least one computer to assigning the first link to one of a plurality of different groups of links according to an estimated channel gain of the first link relative to estimated channel gains of other links;
      code for causing said at least one computer to determine priority of the first link for a first time period based on a link identifier corresponding to the first link and the group of links to which the first link was assigned; and
      code for causing said at least one computer to make a first link scheduling decision for the first time period as a function of the determined priority of the first link.

16. A first wireless communications device for use in an ad hoc network, the first wireless communications device comprising:
   at least one processor configured to:
      estimate link channel gain for each of a plurality of links in said ad hoc network;
      assign a first link to one of a plurality of different groups of links according to an estimated channel gain of the first link relative to estimated channel gains of other links;
      determine priority of the first link for a first time period based on a link identifier corresponding to the first link and the group of links to which the first link was assigned; and
      make a first link scheduling decision for the first time period as a function of the determined priority of the first link; and
   memory coupled to said at least one processor.

17. The first wireless communications device of claim 16,
   wherein said plurality of different groups includes a first group of links, links in said first group corresponding to a first channel gain range; and
   wherein said plurality of different groups includes a second group of links, links in said second group corresponding to a second channel gain range, said second channel gain range having a higher gain than said first channel gain range.

18. The first wireless communications device of claim 17, wherein said at least one processor is configured to determine the channel gain for an individual link from i) the received power of a connection identifier signal corresponding to the individual link transmitted by a first node, which corresponds to a first end of said individual link and ii) the received power of a reverse connection identifier signal corresponding to the individual link, said reverse connection identifier signal transmitted by said first node.

19. The first wireless communications device of claim 17, wherein the priority of the different link groups is based on channel gain, the priority of a group of high gain links not falling between the priority of links corresponding to different groups of links having lower gains.

20. The first wireless communications device of claim 16, wherein said at least one processor is further configured to:
   determine the distribution of estimated channel gains for links in said plurality of links; and
   wherein said at least one processor is configured to assign the first link to one of a plurality of different groups of links according to an estimated channel gain of the first link relative to the estimated channel gains of other links based on the position of the estimated gain of the first link within the distribution of estimated channel gains, as part of being configured to assign the first links.

\* \* \* \* \*